United States Patent
Nishikawa et al.

(10) Patent No.: US 9,129,437 B2
(45) Date of Patent: Sep. 8, 2015

(54) LINE PLOTTING METHOD

(75) Inventors: Kouji Nishikawa, Yokohama (JP);
Makoto Adachi, Yokohama (JP);
Masayuki Nakamura, Yokohama (JP);
Motonobu Mamiya, Yokohama (JP);
Kae Yamashita, Yokohama (JP)

(73) Assignee: Cypress Semiconductor Corporation, San Jose, CA (US)

( * ) Notice: Subject to any disclaimer, the term of this patent is extended or adjusted under 35 U.S.C. 154(b) by 1002 days.

(21) Appl. No.: 12/428,212

(22) Filed: Apr. 22, 2009

(65) Prior Publication Data

US 2009/0322759 A1    Dec. 31, 2009

(30) Foreign Application Priority Data

Jun. 27, 2008    (JP) .................. 2008-168463

(51) Int. Cl.
*G06T 11/20* (2006.01)
(52) U.S. Cl.
CPC .................... *G06T 11/203* (2013.01)
(58) Field of Classification Search
CPC .................................................... G06T 11/203
USPC ........................................................ 345/443
See application file for complete search history.

(56) References Cited

U.S. PATENT DOCUMENTS

| | | | |
|---|---|---|---|
| 5,473,709 A | 12/1995 | Aoki | |
| 5,729,750 A | 3/1998 | Ishida | |
| 5,764,228 A * | 6/1998 | Baldwin | .................. 715/797 |
| 7,307,628 B1 | 12/2007 | Goodman et al. | |
| 7,884,825 B2 | 2/2011 | Nakahashi et al. | |
| 2004/0139080 A1 | 7/2004 | Schmidt et al. | |
| 2008/0062204 A1 | 3/2008 | Ramchandani et al. | |
| 2008/0198163 A1 | 8/2008 | Nakahashi et al. | |

FOREIGN PATENT DOCUMENTS

| | | | |
|---|---|---|---|
| JP | 3-206570 | * | 9/1991 |
| JP | 03-215893 A | | 9/1991 |
| JP | 05-054145 A | | 3/1993 |
| JP | 07-028451 A | | 1/1995 |
| JP | 08-077372 A | | 3/1996 |
| JP | 10-3471 | * | 1/1998 |

(Continued)

OTHER PUBLICATIONS

Mark Segal and Kurt Akeley, The OpenGL Graphics System: A Specification, Version 2.1, OpenGL.org, Dec. 1, 2006, pp. 101-108.*

(Continued)

*Primary Examiner* — Jeffery A Brier

(57) ABSTRACT

A line plotting method for plotting lines whose coordinates are given on a display screen on which pixels are arranged according to a prescribed rule, the method includes correcting coordinates at the end point of a line on the basis of which the end point is a starting point or an ending point or whether the end point is inside a prescribed frame determining whether a direction from a starting point of a line after correction toward its ending point horizontally or vertically is the same as a direction from a starting point before correction of a line toward its ending point determining whether integer values of the coordinates of starting and ending points after correction are the same when directions from starting points after and before correction of a line toward their ending points are not matched.

13 Claims, 33 Drawing Sheets

(56) References Cited

FOREIGN PATENT DOCUMENTS

| JP | 11-031233 A | 2/1999 |
| JP | 2006-209223 A | 8/2006 |

OTHER PUBLICATIONS

Mark Segal and Kurt Akeley, The OpenGL Graphics System: A Specification, Version 1.1, OpenGL.org, Mar. 29, 1997, sections 3.4 and 3.4.1, pp. 1-8.*

OpenGL, Wikipedia, the free encyclopedia, Jan. 14, 2012, 18 pages.*

Chengyu Sun, Divyakant Agrawal, and Amr El Abbadi, Hardware Acceleration for Spatial Selections and Joins, 2003, Proceeding SIGMOD '03 Proceedings of the 2003 ACM SIGMOD international conference on Management of data, pp. 455-466.*

Nagender Bandi, Chengyu Sun, Divyakant Agrawal, and Amr El Abbadi, Fast computation of spatial selections and joins using graphics hardware, 2007, Information Systems, Accepted Dec. 5, 2006, Available online Feb. 12, 2007, vol. 32, Issue 8, Dec. 2007, pp. 1073-1100.*

OpenGL SuperBible; "14 Rasterization and Operations on the Framebuffer", Jun. 22, 2008, pp. 1-5 and proof of age (1.p.) according to the Internet Archive "WayBack", http://www.opengl.org/resources/faq/technical/rasterization.htm; eHB.

Office Action from DE 102009018928.9 dated Jul. 10, 2012, 16 pages.

Bug 501, P3D and OPENGL rect( ) stroke-pixel in the upper right corner missing, dated Apr. 18, 2007, 2 pages.

OpenGL, The Industry's Foundation for High Performance Graphics, dated Sep. 10, 2003, 2 pages.

Chengyu, Sun et al., Hardware Acceleration for Spatial Selections and Joins, Sigmod 2003, Jun. 9-12, 2003, San Diego, CA, 12 pages.

Mark Segal, et al., The OpenGL® Graphics System: A Specification, Version 1.1, dated Mar. 4, 1997, 161 pages.

English-Language Abstract for Japanese Patent Publication No. 03-215893 A, published Sep. 20, 1991; 2 pages.

English-Language Abstract for Japanese Patent Publication No. 08-077372 A, published Mar. 22, 1996; 2 pages.

English-Language Abstract for Japanese Patent Publication No. 11-031233 A, published Feb. 2, 1999; 2 pages.

* cited by examiner

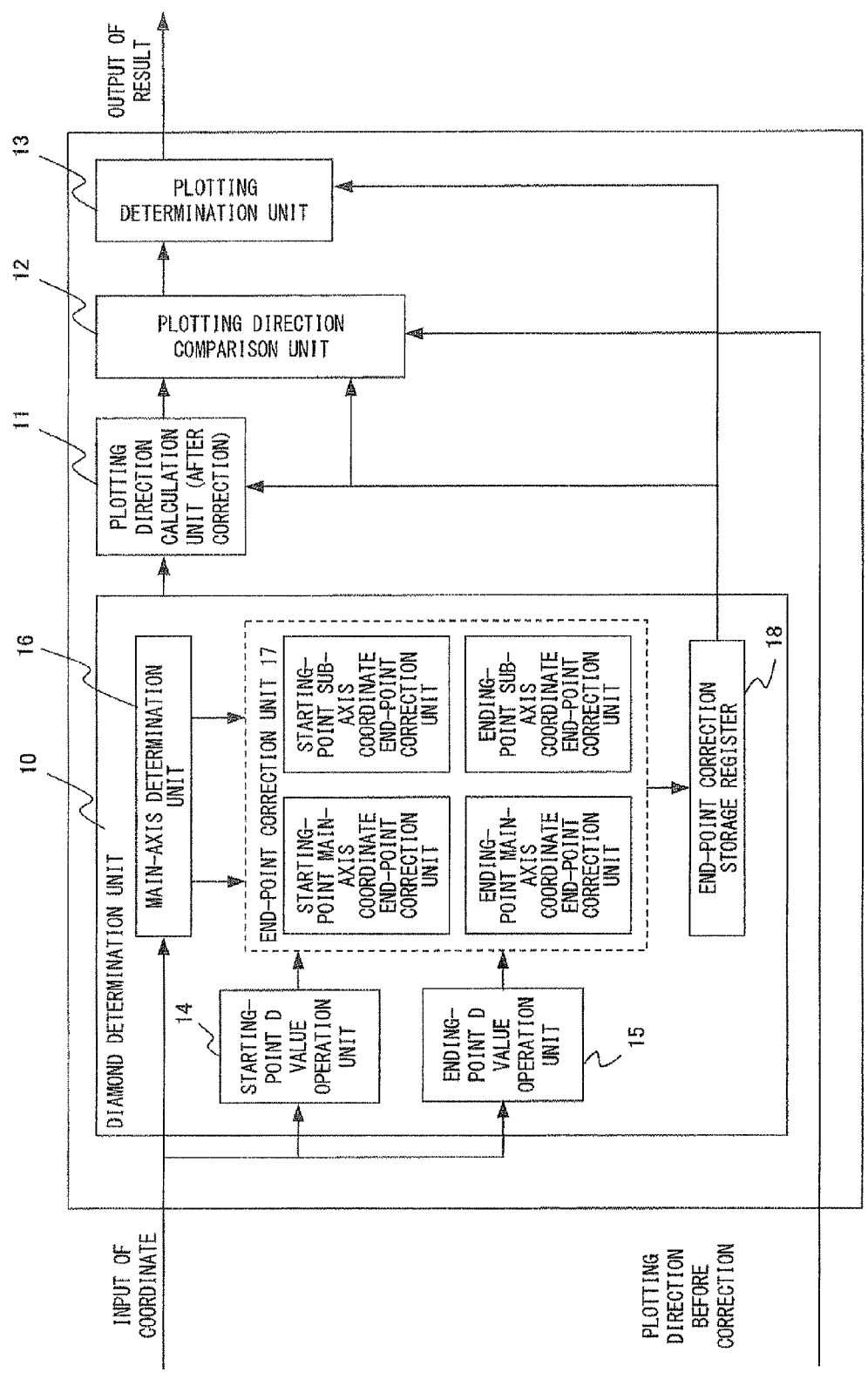
F I G. 1

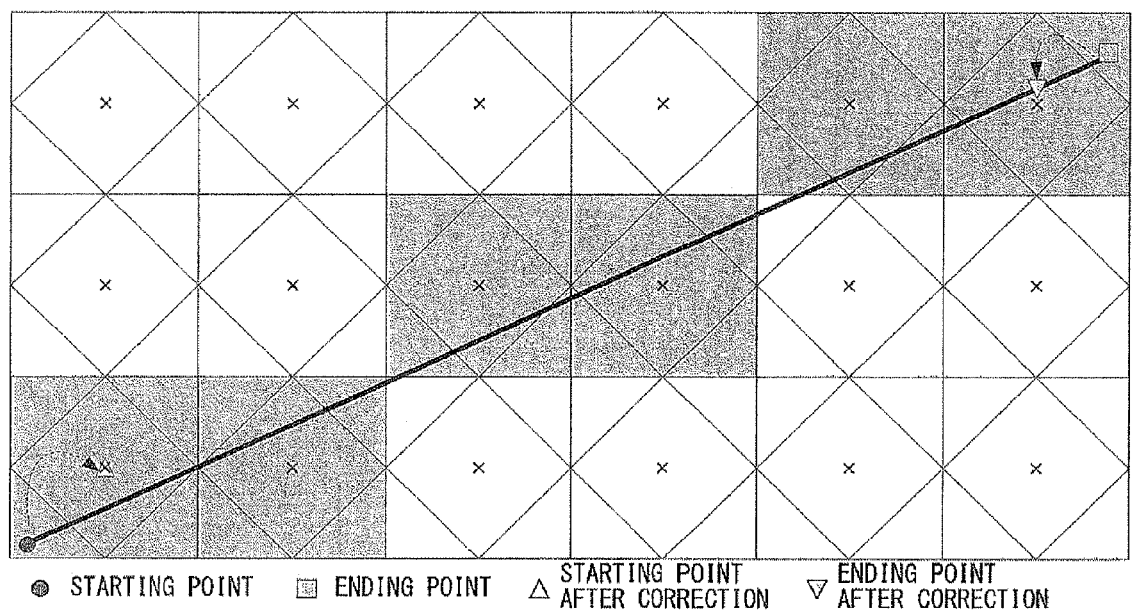
F I G. 14

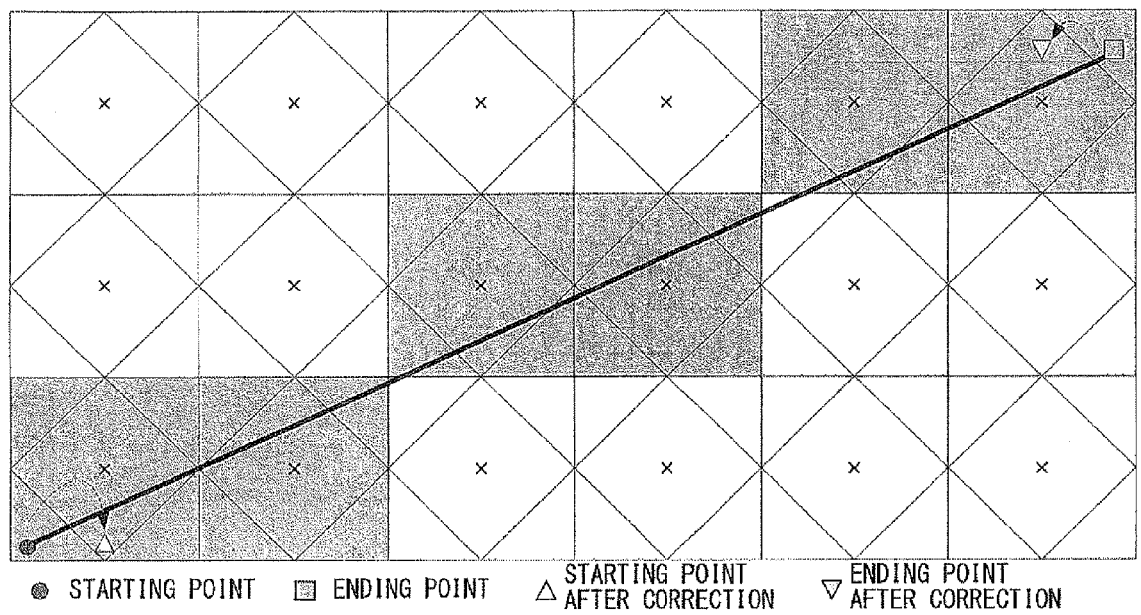
F I G. 15

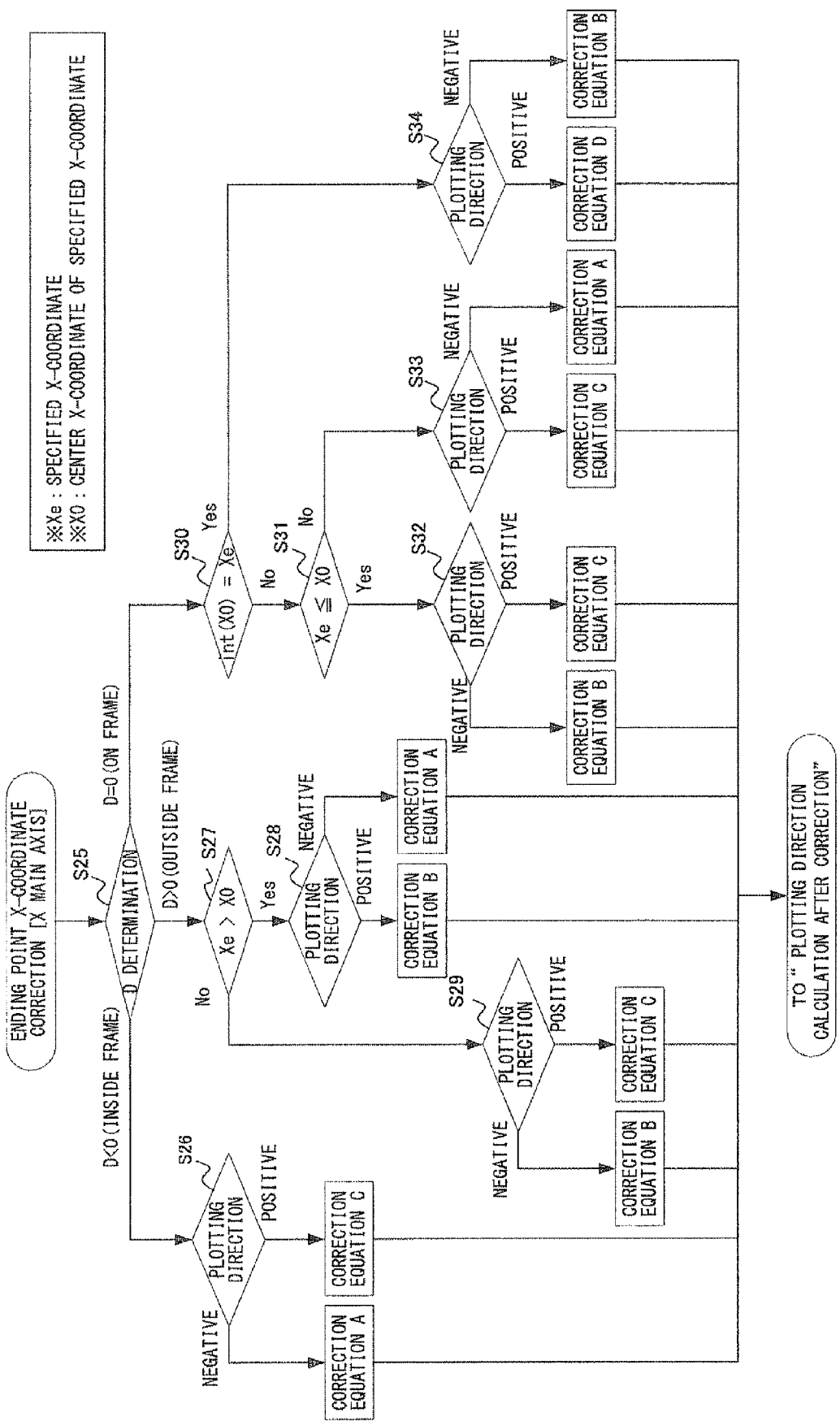
F I G. 20

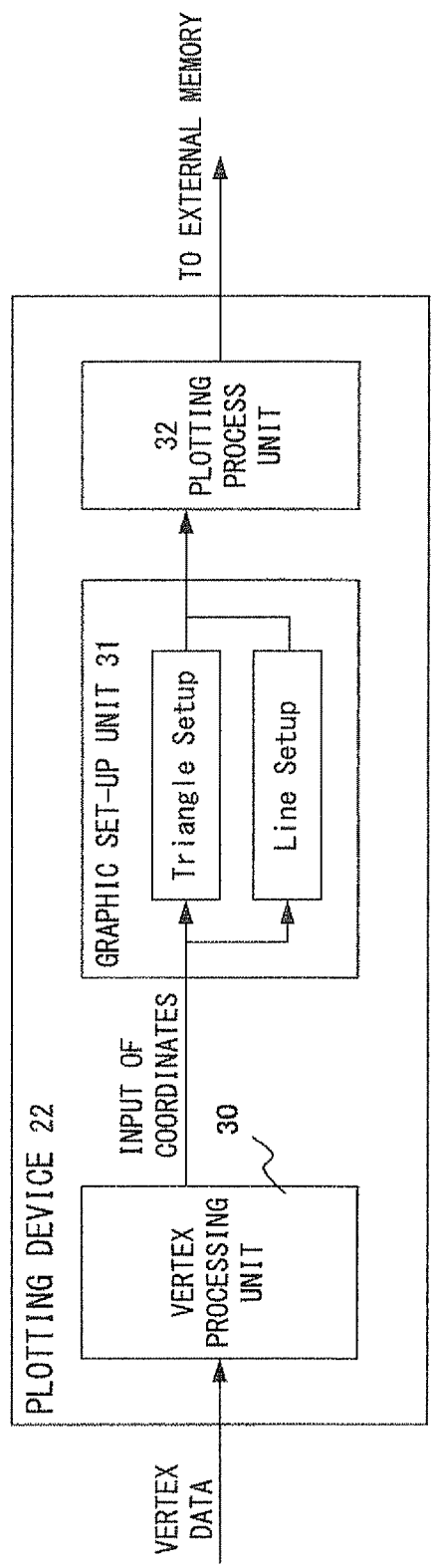
F I G. 27

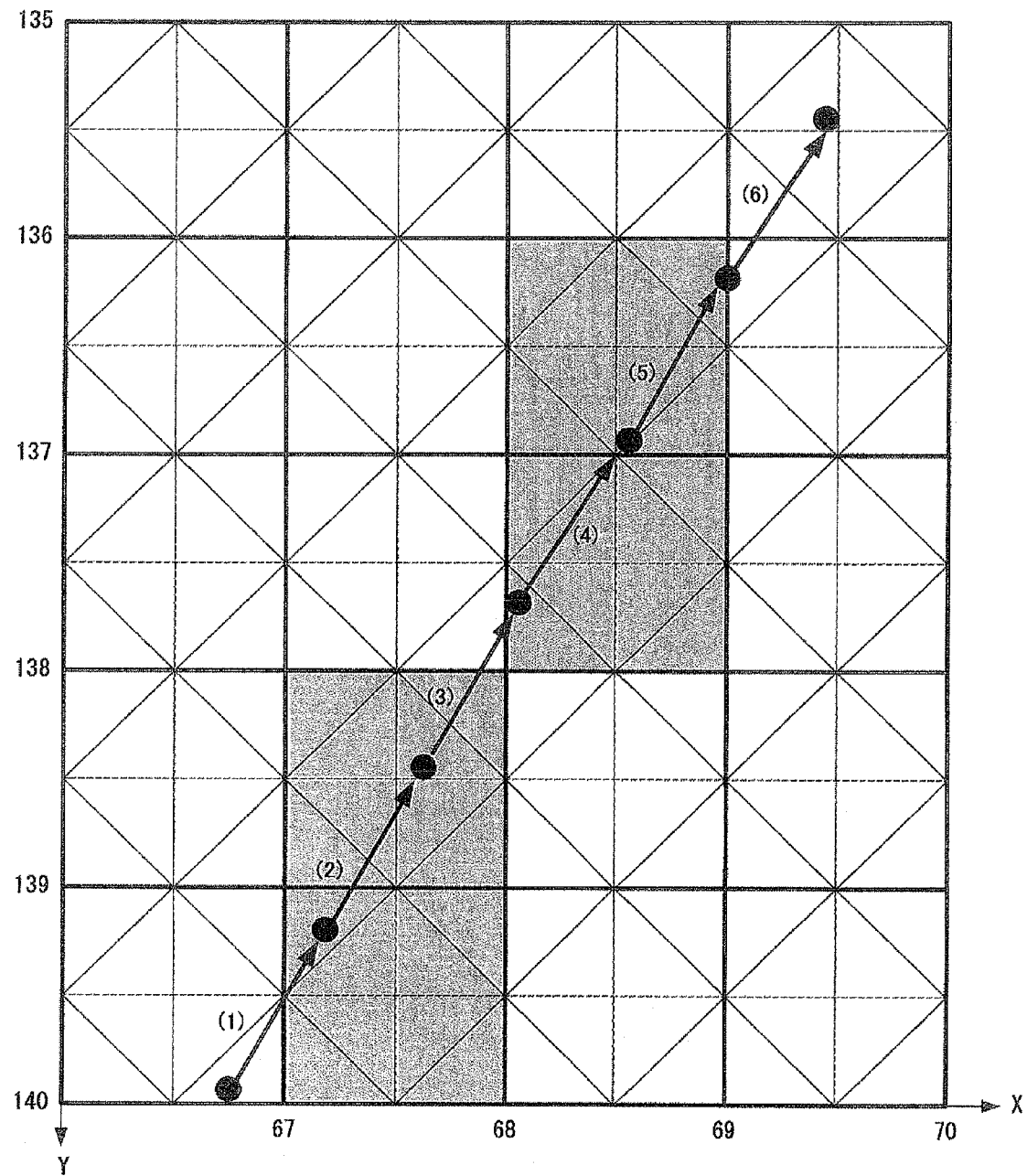
→ LINE IN WHICH IT IS DETERMINED THAT "ONE PIXEL IS PLOTTED"
→ LINE IN WHICH IT IS DETERMINED "NOT TO PLOT" A PIXEL.
 PIXEL TO BE PLOTTED
F I G. 33

LINE PLOTTING METHOD

CROSS-REFERENCE TO RELATED APPLICATION

This application is based upon and claims the benefit of priority of the prior Japanese Patent Application No. 2008-168463, filed on Jun. 27, 2008, the entire contents of which are incorporated herein by reference.

FIELD

The embodiment discussed herein is related to a line plotting method for plotting lines on a screen.

BACKGROUND

As one of line plotting algorithms for plotting lines whose coordinates are given on a display screen on which pixels are arranged, there is a method called DiamondeExit Rule. When lines are plotted according to this algorithm, even in a continuous line plotting, their joints can be connected without any gap and also there occurs no second plotting of pixels. Conventionally, when a DiamondExit Rule is not used, lines are sometimes broken. Therefore, it is preferable to apply a DiamondExit Rule when plotting lines.

However, when applying this rule, care is required when plotting a line whose length is less than 1. This is because there are a case where a line is completely vanished (no pixel is plotted) and a case where only one pixel is plotted, depending on the positions of the starting point and ending point of a line.

When applying a DiamondExit Rule, a mechanism for determining how to give the starting and ending points of a line whose length is less than 1 about all thinkable patterns is necessary. However, when attempting to realize logic for determining how to plot about all the patterns by a digital circuit, its circuit scale becomes large and also its process speed slows down. Therefore, a Diamond Exit Rule which can be applied when plotting a line whose length is less than 1 and be realized by simpler logic is desired.

SUMMARY

According to an aspect of the invention, a line plotting method for plotting lines whose coordinates are given on a display screen on which pixels are arranged according to a prescribed rule, the method includes correcting coordinates at the end point of a line on the basis of which the end point is a starting point or an ending point or whether the end point is inside a prescribed frame determining whether a direction from a starting point of a line after correction toward its ending point horizontally or vertically is the same as a direction from a starting point before correction of a line toward its ending point determining whether integer values of the coordinates of starting and ending points after correction are the same when directions from starting points after and before correction of a line toward their ending points are not matched.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block configuration of a line plotting device for implementing the line plotting method in this preferred embodiment.

FIG. 14 explains an end point correction process (No. 7).

FIG. 15 explains an end point correction process (No. 8).

FIG. 20 is a flowchart of the end point correction process according to this preferred embodiment (No. 3).

FIG. 27 is a block configuration of a device for realizing the line plotting method in this preferred embodiment (No. 2).

FIG. 33 is example comparison between this preferred embodiment and the prior art (No. 6).

DESCRIPTION OF EMBODIMENTS

Figure 2:
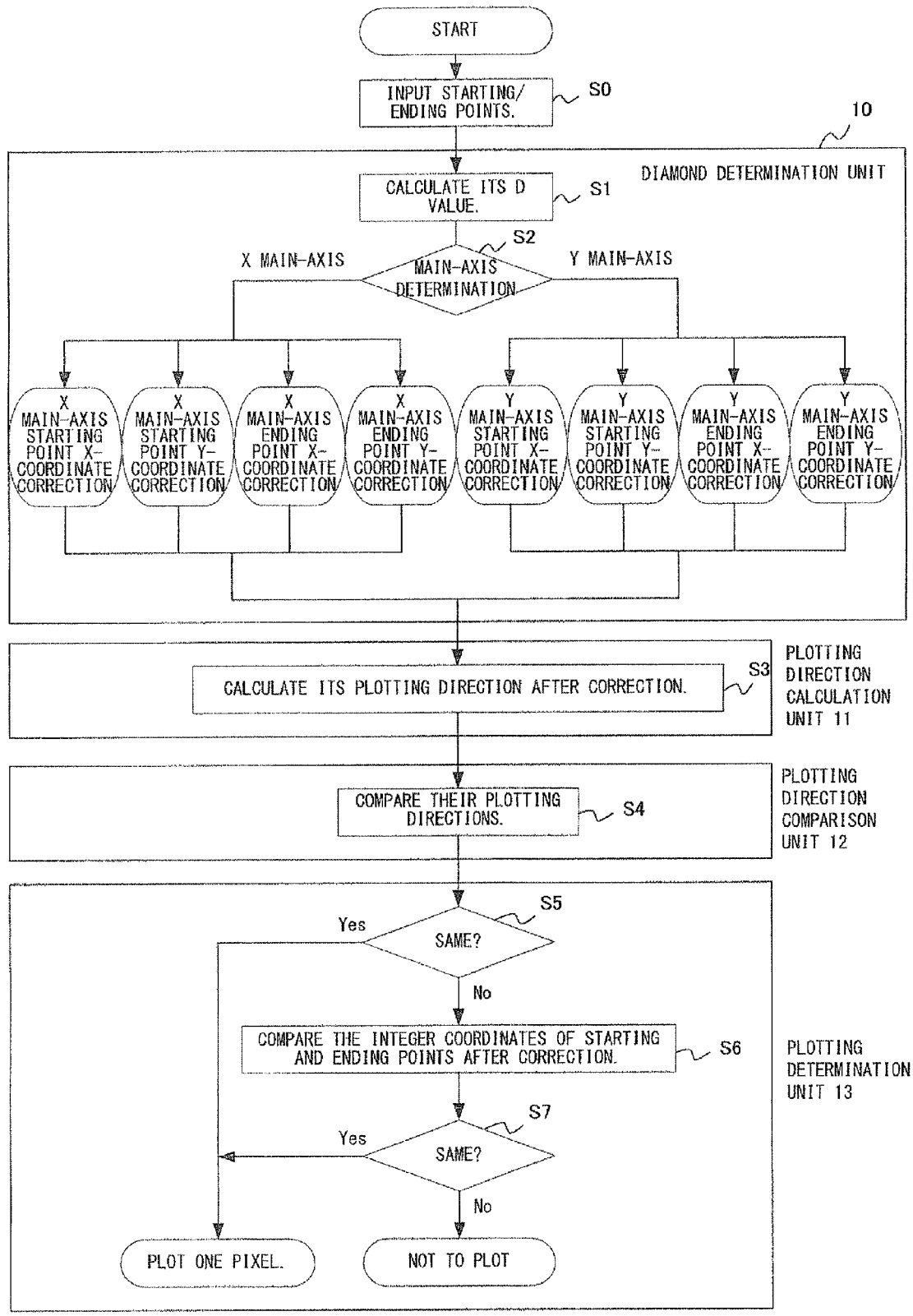
FIG. 2 illustrates a process flow of this preferred embodiment.

In this preferred embodiment, end point correction is applied to the starting and ending points of a line and a plotting direction after correction is obtained. If the obtained plotting direction after correction is the same as a plotting direction before correction, it is determined "to plot (not to vanish)". If the obtained plotting direction after correction does not coincide with a plotting direction before correction, furthermore the integer values of the starting-point coordinates and ending-point coordinates after correction are compared (the integer value of the coordinates of a point indicates the position of a pixel). If the integer values are the same, it is determined "to plot (not to vanish)". If the integer values are not matched, it is determined "not to plot (to vanish)". Thus, the plotting of a line whose length is less than 1 can be fairly easily determined.

In FIG. 1, the block configuration of a line plotting device for implementing the line plotting method in this preferred embodiment.

The device illustrated in FIG. 1 is realized by a digital circuit composed of hardware. This preferred embodiment comprises a Diamond determination unit 10 for applying DiamondExit Rule determination to starting and ending points and end-point correction, a plotting direction calculation unit 11 for calculating plotting directions after end-point correction, a plotting direction comparison unit 12 for checking plotting directions before and after correction and a plotting determination unit 13 for finally determining whether to plot pixels. The Diamond determination unit 10 comprises a starting point D-value operation unit 14, an ending point D-value operation unit 15, a main axis determination unit 16, an end-point correction unit 17 and an end-point correction storage register 18. The starting point D-value operation unit 14 calculates a value (D-value) for determining whether a starting point is inside a diamond. The ending point D-value operation unit 15 calculates a value (D-value) for determining whether an ending point is inside a diamond. The main axis determination unit 16 determines which is larger, an X-coordinate difference or a Y-coordinate difference, on the basis of a difference in a coordinates between starting and ending points and sets the axis of the larger coordinates (X- or Y-axis) as the main axis. The end-point correction unit 17 comprises a starting-point main-axis coordinate end-point correction unit, a starting-point sub-axis coordinate end-point correction unit, an ending-point main-axis coordinate end-point correction unit and an ending-point sub-axis coordinate end-point correction unit, and applies end-point correction to the main-axis coordinates and sub-axis coordinates (coordinates of the coordinate axis which is not the main axis) of starting and ending points. The end-point correction storage register 18 stores the coordinates of an end point after correction.

FIG. 2 illustrates a process flow of this preferred embodiment.

The Diamond determination unit 10 independently applies end-point correction to the starting and ending points of a line using a DiamondExit Rule. When the coordinates of the starting and ending points are inputted (step S0), in step S1 the Diamond determination unit 10 calculates the D-values of the starting and ending points. The D value is calculated as follows.

$$Z=|X1-X0|+|Y1-Y0|$$

If Z<0.5, it is inside a Diamond frame. If Z≥0.5, it is outside the Diamond frame.

In the above equation, (X1, Y1) is the coordinates of a starting point or an ending point and (X0, Y0) is the coordinates of the pixel center. This equation determines whether the coordinate position of a starting point or an ending point inside a diamond of a pixel. Then, a main-axis determination is applied. In each of the case where the X-axis is the main axis and the case where the Y-axis is the main axis, the X or Y coordinate axes of starting and ending points are corrected.

After the end-point correction, the plotting direction calculation unit 11 obtains a plotting direction after correction and transmits its result to the plotting direction comparison unit 12 (step S3). A plotting direction after correction is obtained by subtracting the main-axis coordinates of a starting point after correction from the main-axis coordinates of an ending point after correction. If its subtraction result is negative, the plotting direction is determined to be "negative". If it is positive, the plotting direction is determined to be "positive". Its reversal can also be possible (it is enough if the calculation method is consistent before and after correction).

The plotting direction comparison unit 12 checks the plotting direction before and after the correction (step S4). The comparison result is sent to the plotting determination unit 13. Note that the plotting direction before correction is obtained by subtracting the main axis coordinate of the starting point before correction from the main axis coordinate of the ending point before correction. If the subtraction result is negative, the plotting direction is determined as "negative" and if it is positive, the plotting direction is determined as "positive", or vise versa. (it is enough if the calculation method is consistent before and after correction.)

The plotting determination unit 13 determines whether the received plotting direction comparison results are "matched" (step S5). If it is yes, it is determined to "plot one pixel". If the received plotting direction comparison results are "unmatched", the integer values of the main-axis coordinates of a starting point after correction and the main-axis coordinates of an ending point after correction are compared (step S6) and determines whether the integer values are the same (step S7). If they are the same, it is determined "to plot one pixel". If they are different, it is determined "not to plot".

Next, the Diamond Exit Rule is described.

Figure 3:
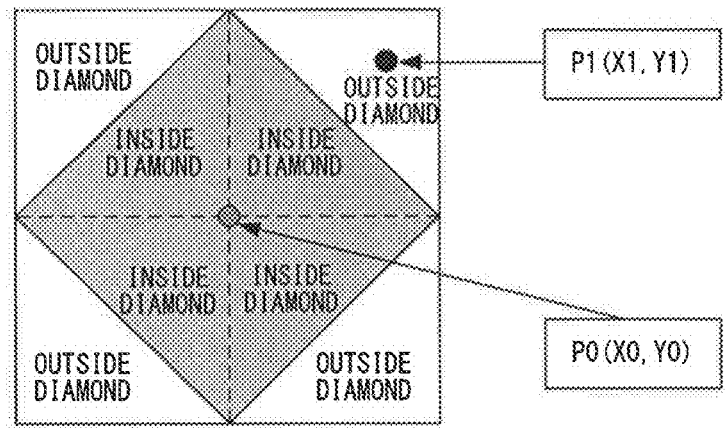
FIG. 3 illustrates the definition of a Diamond frame.

FIG. 3 illustrates the definition of a Diamond frame.

As illustrated in FIG. 3, a group of these points is defined as a "Diamond frame". The inside and outside (including the frame) of the group of points are defined as inside the Diamond frame and outside the Diamond frame, respectively. The definition equation of the Diamond frame is as follows.

$$|X1-X0|+|Y1"Y0|=0.5$$

In the above equation, (X1, Y1) is the coordinates of a starting point or an ending point and (X0, Y0) is the coordinates of the pixel center.

Figure 4:
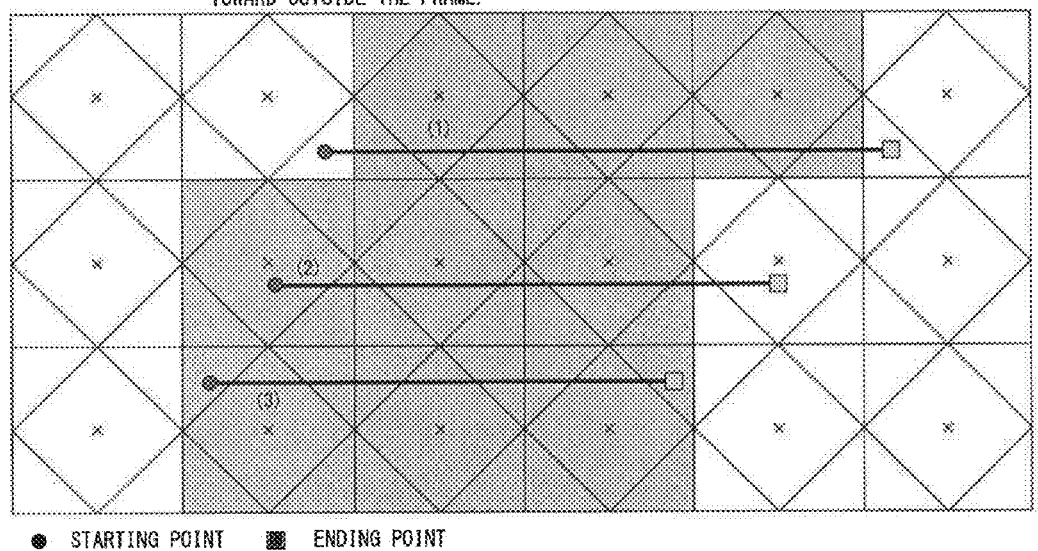
FIG. 4 is an example application of a DiamondExit Rule (No. 1).
Figure 5:
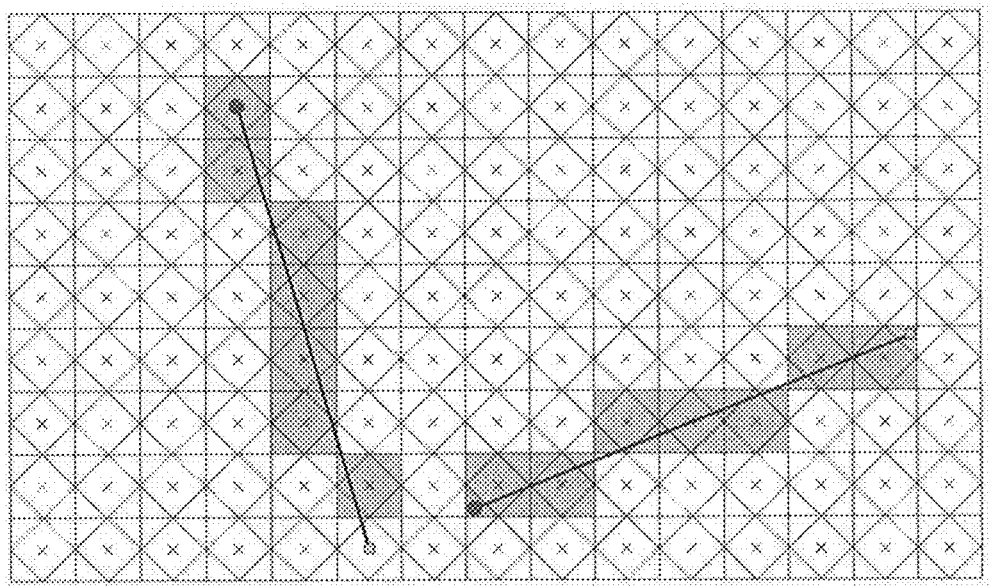
FIG. 5 is an example application of a DiamondExit Rule (No. 2).
Figure 6A:
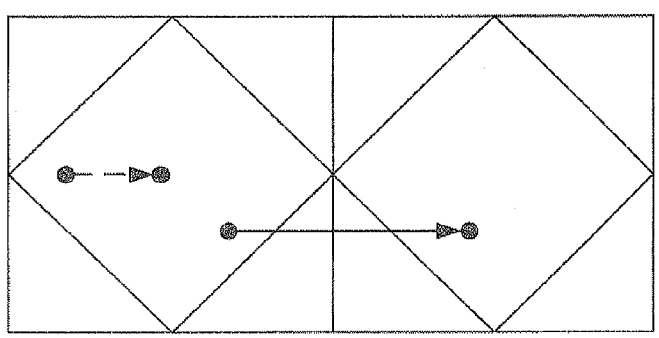
FIGS. 6A-6D illustrate how to give the starting and ending points of a line whose length is 1 and a rule how to plot the points according to a DiamondExit Rule.
Figure 6B:
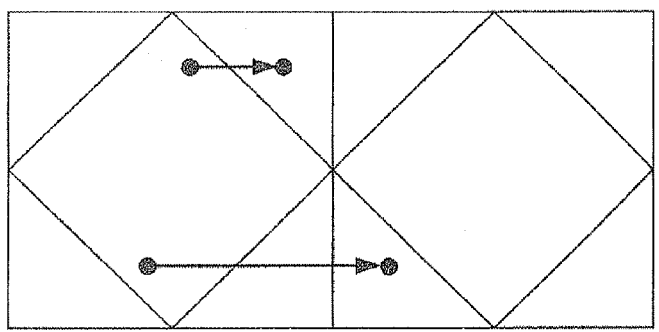
Figure 6C:
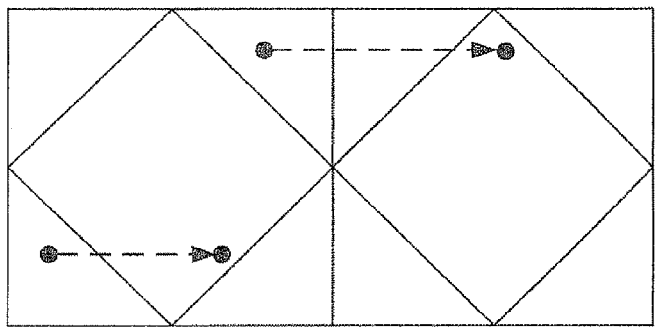
Figure 6D:
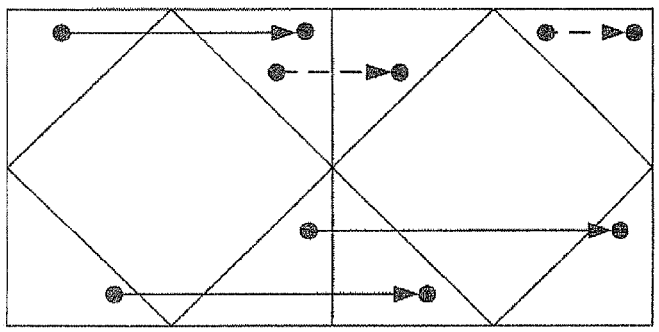

FIGS. 4 and 5 are example applications of a DiamondExit Rule.

When a DiamondExit Rule is applied, a pixel having a line segment that intersects with a Diamond frame and goes from inside the frame toward outside the frame is plotted. In the case of (1), since the starting point of a pixel including the starting point does not intersect with the Diamond frame, the starting point is not plotted. Since the ending point of a pixel including the ending point does not intersect with the Diamond frame, the ending point is not plotted. In the case of (2), since there is a line segment that intersects with a Diamond frame and goes from inside the frame toward outside the frame, the starting point is plotted. Since there is no line segment that intersects with a Diamond frame and goes from inside the frame toward outside the frame, the ending point is not plotted. In the case of (3), since there is a line segment that intersects with a Diamond frame and goes from inside the frame toward outside the frame, the starting point is plotted. Since there is a line segment that intersects with a Diamond frame and goes from inside the frame toward outside the frame, the ending point is plotted.

As illustrated in FIG. 5, of the line segment from the starting point indicated by a circle until the ending point indicated by a rectangle, only pixels matched with the above rule are plotted.

In FIGS. 6A through 6D, how to give the starting and ending points of a line whose length is 1 and a rule how to plot the points according to the DiamondExit Rule are illustrated.

Although in these examples, lines are plotted "from left to right" (11 examples), lines can be plotted in four directions of "from left to right", "from right to left", "from top to bottom" and "from bottom to top". Therefore, there are at least 44 ways. Of the arrow marks described in FIGS. 6A-6D, the arrow marks indicated by solid lines represent "to plot one pixel" and the arrow marks indicated by dotted lines represent "not to plot".

So far the summary of the DiamondExit Rule has been described.

Next, the basic idea of line plotting is described below.

Figure 7A:
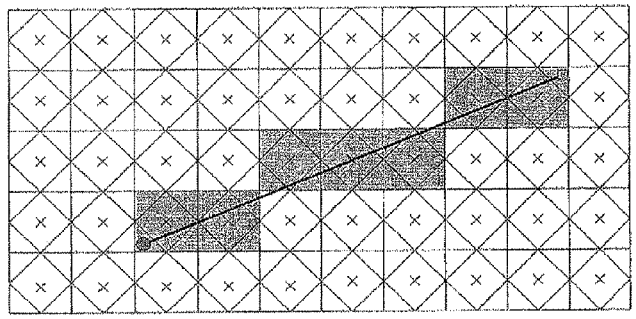
FIGS. 7A-7B explain the basic idea of line plotting.
Figure 7B:
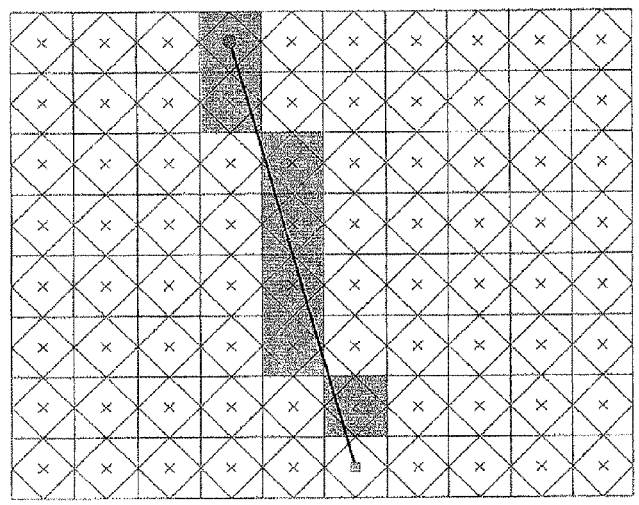

FIGS. 7A and 7B explain the basic idea of line plotting.

When plotting a line, lines are classified into the X main-axis and the Y main-axis as follows by comparing $\Delta X$ and $\Delta Y$.

−X main-axis: "$\Delta X \geq \Delta Y$"

−Y main-axis: "$\Delta X < \Delta Y$"

$\Delta X$: Absolute value of a value obtained by subtracting the X-coordinate of a starting point from the X-coordinate of an ending point $\Delta Y$: Absolute value of a value obtained by subtracting the Y-coordinate of a starting point from the Y-coordinate of an ending point.

FIGS. 7A and 7B illustrate examples of X main-axis and Y main-axis lines, respectively.

As illustrated in FIGS. 7A and 7B, in the case of a Y main-axis line, the main-axis and sub-axis coordinates are defined to be a Y-coordinate and an X-coordinate, respectively. In the case of an X main-axis line, the main-axis and sub-axis coordinates are defined to be an X-coordinate and a Y-coordinate, respectively.

So far the basic idea of line plotting has been described.

FIGS. 8 through 17 explain an end point correction process.

The basic idea of the correction operation is as follows.

As to a starting point, only when specified coordinates including those of a pixel including the specified starting coordinates are outside the Diamond frame, the main-axis coordinates are corrected up to the center of a pixel in which a line segment going from inside the frame toward the outside the frame first intersects with the Diamond frame. As to the sub-axis coordinate, ((the moving distance of the main-axis coordinate)*(the inclination value of a line)) is added to the sub-axis coordinate of a starting-point and it is corrected. As to an ending point, the main-axis coordinates are corrected up to the center of a pixel in which a line segment going from inside the frame toward the outside the frame last intersects with the Diamond frame. No sub-axis coordinate is corrected.

Figure 8:
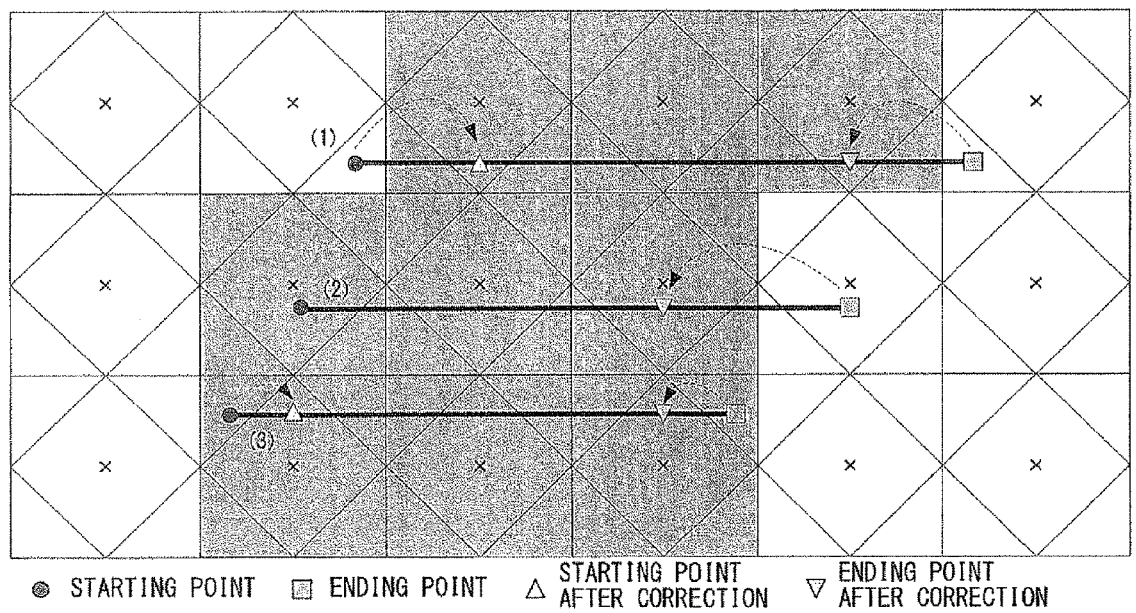
FIG. 8 explains an end point correction process (No. 1)

In FIG. 8, in the case of (1), as to a starting point, since a pixel in which a line segment going from inside the frame toward the outside the frame first intersects with the Diamond frame is a pixel immediately after a pixel including a starting point, the main-axis coordinates (since the line in FIG. 8 is an X main-axis, the main-axis coordinate is an X-coordinate) are corrected up to the center of the pixel immediately after it. The sub-axis coordinate is corrected following the above-described correction operation. Its position after correction is indicated by an upward triangle. As to an ending point, since a pixel in which a line segment going from inside the frame toward the outside the frame last intersects with the Diamond frame is a pixel immediately before a pixel including an ending point, the main-axis coordinates (since the line in FIG. 8 is an X main-axis, the main-axis coordinate is an X-coordinate) are corrected up to the center of the pixel immediately before it. Its correction result is indicated by a downward triangle.

In the case of (2), as to a starting point, a pixel in which a line segment going from inside the frame toward the outside the frame first intersects with the Diamond frame is a starting point. However, since it includes a starting point and the starting point is inside the Diamond frame, the starting point is not corrected. As to an ending point, since a pixel in which a line segment going from inside the frame toward the outside the frame last intersects with the Diamond frame is a pixel immediately before a pixel including an ending point, the main-axis coordinate (since the line in FIG. 8 is an X main-axis, the main-axis coordinate is an X-coordinate) is corrected up to the center of the pixel immediately before it. Its correction result is indicated by a downward triangle.

In the case of (3), as to a starting point, a pixel in which a line segment going from outside the frame toward the outside the frame first intersects with the Diamond frame is a starting point. However, since it includes a starting point and the starting point is outside the Diamond frame, the main-axis coordinate (since the line in FIG. 8 is an X main-axis, the main-axis coordinate is an X-coordinate) is corrected up to the center of the pixel. The sub-axis coordinates are corrected following the above-described correction operation. As a result, its correction position is indicated by an upward triangle. As to an ending point, a pixel in which a line segment going from inside the frame toward the outside the frame last intersects with the Diamond frame includes an ending point. However, since an ending pixel is always corrected, the main-axis coordinate (since the line in FIG. 8 is an X main-axis, the main-axis coordinate is an X-coordinate) is corrected up to the center of the pixel including an ending point. Its result is indicated by a downward triangle.

Figure 9:
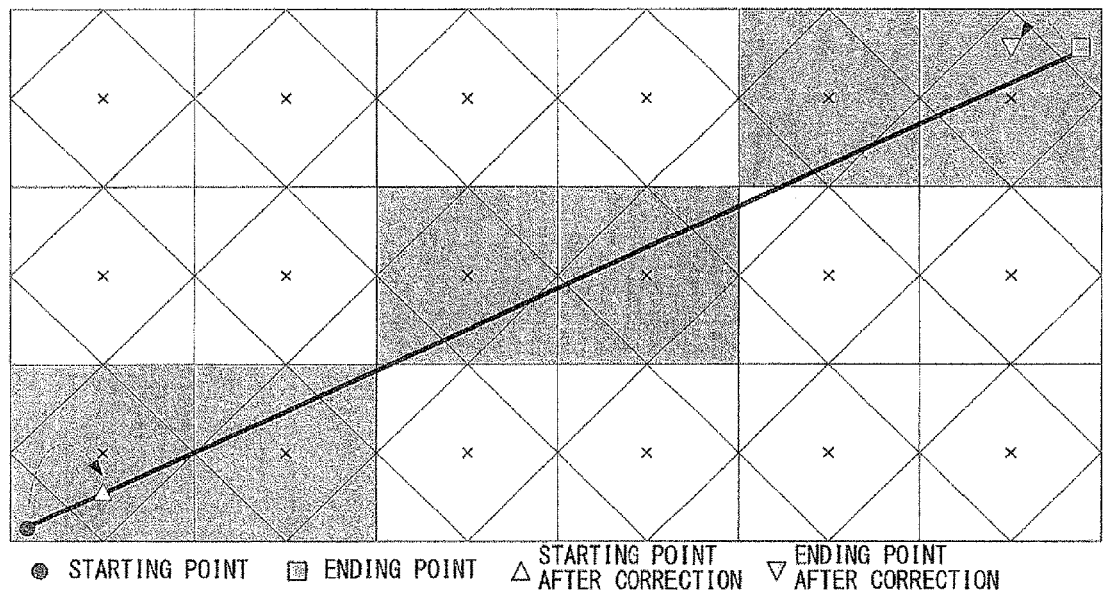
FIG. 9 explains an end point correction process (No. 2).

FIG. 9 explains a detailed correction example of an end point (No. 1).

As to a starting point, a pixel in which a line segment going from outside the frame toward the outside the frame first intersects with the Diamond frame includes a starting point. However, since it includes a starting point and the starting point is outside the Diamond frame, the main-axis coordinate (since the line in FIG. 9 is an X main-axis, the main-axis coordinate is an X-coordinate) is corrected up to the center of the pixel. As to the sub-axis coordinate, ((the moving distance of the main-axis coordinate)*(the inclination value of a line)) is added to the sub-axis coordinate of a starting point and it is corrected. The result is indicated by an upward triangle. As to an ending point, a pixel in which a line segment going from inside the frame toward the outside the frame last intersects with the Diamond frame includes an ending point. However, since an ending point is always corrected, the main-axis coordinate (since the line in FIG. 9 is an X main-axis, the main-axis coordinate is an X-coordinate) is corrected up to the center of the pixel including an ending point. No sub-axis coordinate is corrected. Its result is indicated by a downward triangle.

Figure 10:
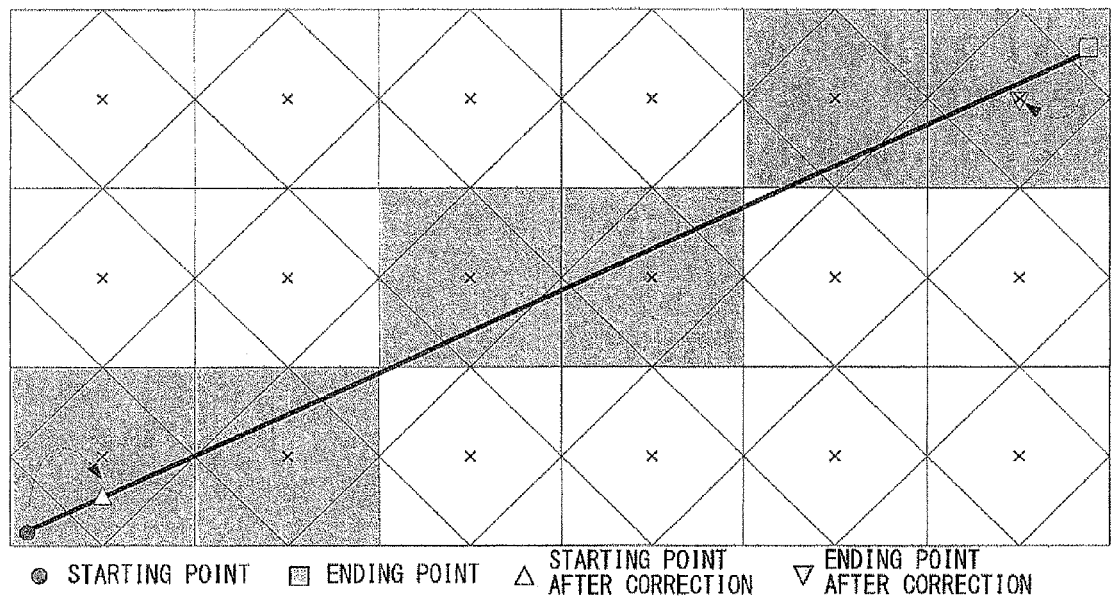
FIG. 10 explains an endpoint correction process (No. 3).

FIG. 10 explains a detailed correction example of an end point (No. 2).

As to a starting point, a pixel in which a line segment going from outside the frame toward the outside the frame first intersects with the Diamond frame includes a starting point. However, since it includes a starting point and the starting point is outside the Diamond frame, the main-axis coordinate (since the line in FIG. 10 is an X main-axis, the main-axis coordinate is an X-coordinate) is corrected up to the center of the pixel. As to the sub-axis coordinate, ((the moving distance of the main-axis coordinate)*(the inclination value of a line))

is added to the sub-axis coordinate of a starting point and it is corrected. The result is indicated by an upward triangle. As to an ending point, a pixel in which a line segment going from inside the frame toward the outside the frame last intersects with the Diamond frame includes an ending point. Therefore, the main-axis coordinate (since the line in FIG. 10 is an X main-axis, the main-axis coordinate is an X-coordinate) is corrected up to the center of the pixel including an ending point. The sub-axis coordinate is corrected to the position of the center of the pixel. Its result is indicated by a downward triangle.

Figure 11:
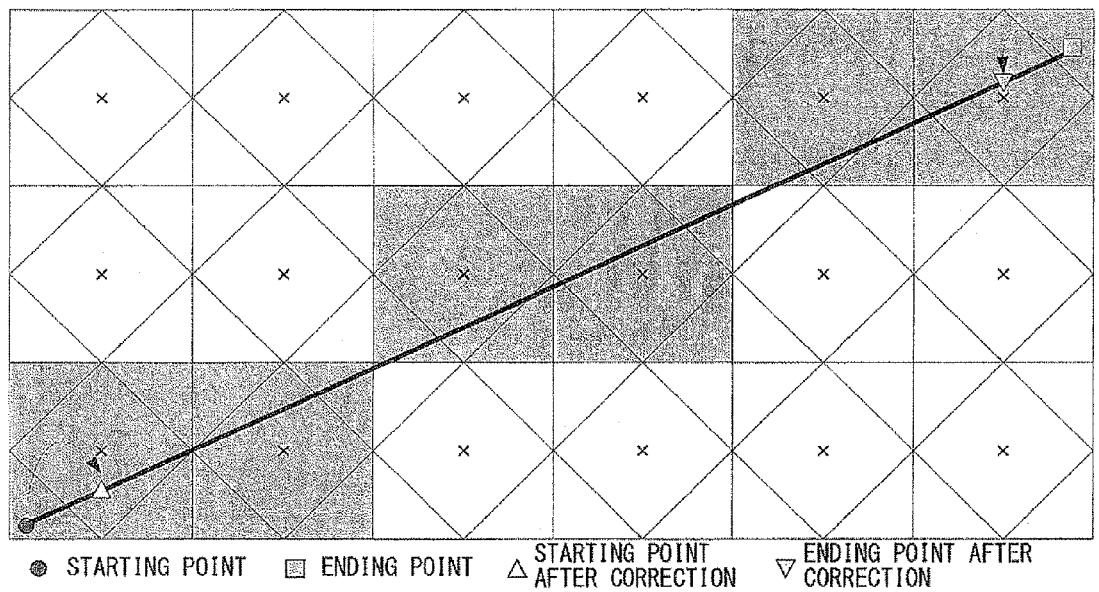
FIG. 11 explains an endpoint correction process (No. 4).

FIG. 11 explains a detailed correction example of an end point (No. 3).

As to a starting point, a pixel in which a line segment going from outside the frame toward the outside the frame first intersects with the Diamond frame includes a starting point. However, since it includes a starting point and the starting point is outside the Diamond frame, the main-axis coordinate (since the line in FIG. 11 is an X main-axis, the main-axis coordinate is an X-coordinate) is corrected up to the center of the pixel. As to the sub-axis coordinate, ((the moving distance of the main-axis coordinate)*(the inclination value of a line)) is added to the sub-axis coordinate of a starting point and it is corrected. The result is indicated by an upward triangle. As to an ending point, a pixel in which a line segment going from inside the frame toward the outside the frame last intersects with the Diamond frame includes an ending point. Therefore, the main-axis coordinate (since the line in FIG. 11 is an X main-axis, the main-axis coordinate is an X-coordinate) is corrected up to the center of the pixel including an ending point. As to the sub-axis coordinate, ((the moving distance of the main-axis coordinate)*(the inclination value of a line)) is subtracted from the sub-axis coordinate of an ending point and it is corrected. Its result is indicated by a downward triangle.

Figure 12:
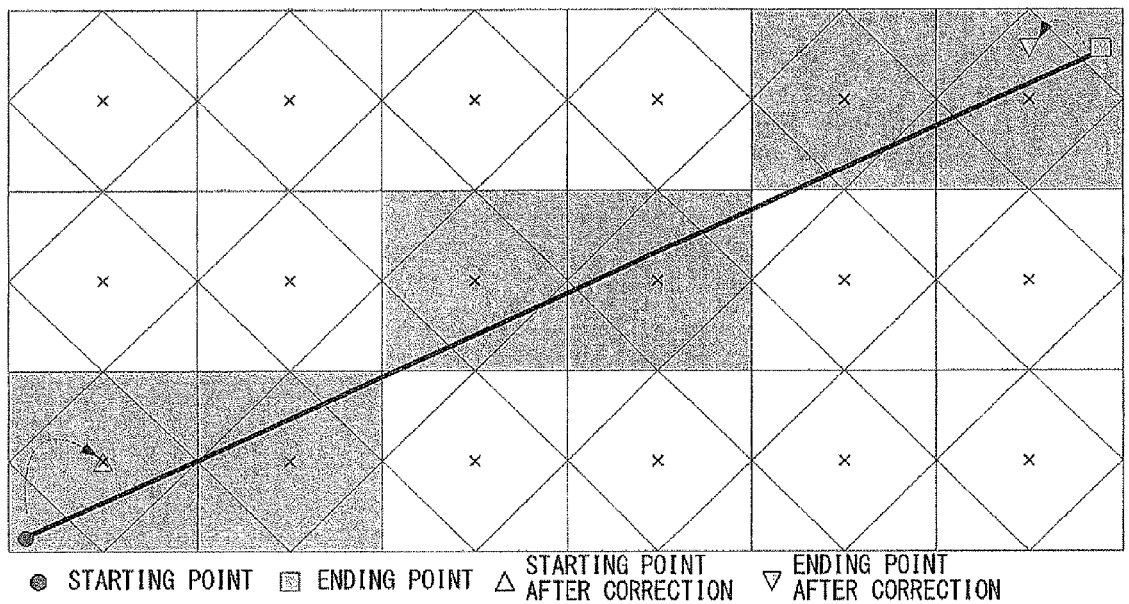
FIG. 12 explains an endpoint correction process (No. 5).

FIG. 12 explains a detailed correction example of an end point (No. 4).

As to a starting point, a pixel in which a line segment going from outside the frame toward the outside the frame first intersects with the Diamond frame includes a starting point. However, since it includes a starting point and the starting point is outside the Diamond frame, the main-axis coordinate (since the line in FIG. 12 is an X main-axis, the main-axis coordinate is an X-coordinate) is corrected up to the center of the pixel. The sub-axis coordinate is also corrected up to the center of the pixel. Its result is indicated by an upward triangle. As to an ending point, a pixel in which a line segment going from inside the frame toward the outside the frame last intersects with the Diamond frame includes an ending point. However, since an ending point is always corrected, the main-axis coordinate (since the line in FIG. 12 is an X main-axis, the main-axis coordinate is an X-coordinate) is corrected up to the center of the pixel including an ending point. No sub-axis coordinate is corrected. Its result is indicated by a downward triangle.

Figure 13:
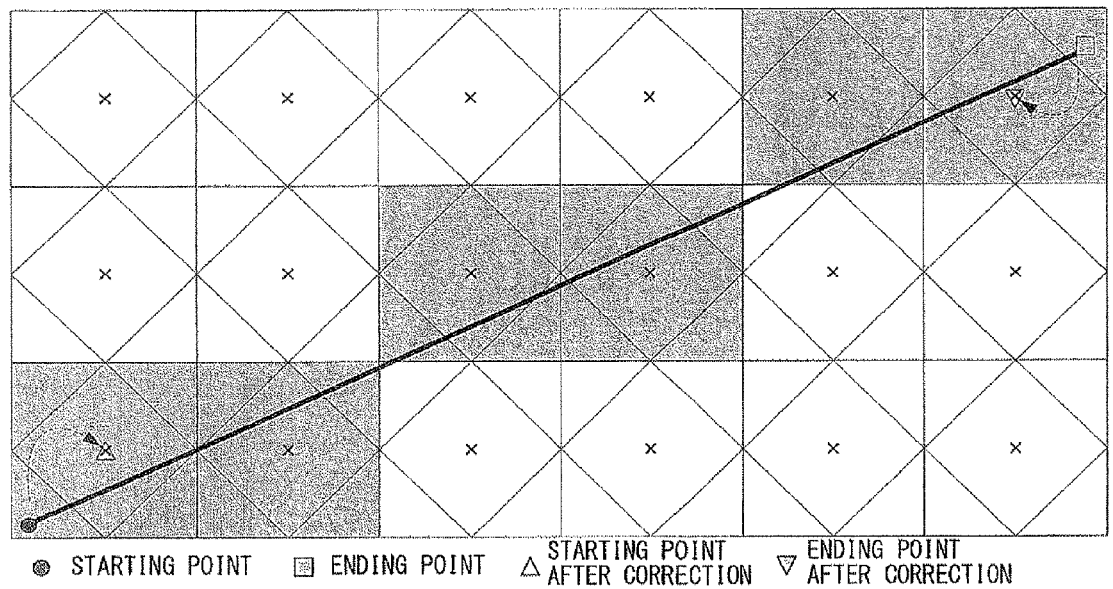
FIG. 13 explains an end point correction process (No. 6).

FIG. 13 explains a detailed correction example of an end point (No. 5).

As to a starting point, a pixel in which a line segment going from outside the frame toward the outside the frame first intersects with the Diamond frame includes a starting point. However, since it includes a starting point and the starting point is outside the Diamond frame, the main-axis coordinate (since the line in FIG. 13 is an X main-axis, the main-axis coordinate is an X-coordinate) is corrected up to the center of the pixel. The sub-axis coordinate is also corrected up to the center of the pixel. Its result is indicated by an upward triangle. As to an ending point, a pixel in which a line segment going from inside the frame toward the outside the frame last intersects with the Diamond frame includes an ending point. Therefore, the main-axis coordinate (since the line in FIG. 13 is an X main-axis, the main-axis coordinate is an X-coordinate) is corrected up to the center of the pixel including an ending point. The sub-axis coordinate is corrected to the position of the center of the pixel. Its result is indicated by a downward triangle.

FIG. 14 explains a detailed correction example of an end point (No. 6).

As to a starting point, a pixel in which a line segment going from outside the frame toward the outside the frame first intersects with the Diamond frame includes a starting point. However, since it includes a starting point and the starting point is outside the Diamond frame, the main-axis coordinate (since the line in FIG. 14 is an X main-axis, the main-axis coordinate is an X-coordinate) is corrected up to the center of the pixel. The sub-axis coordinate is also corrected up to the center of the pixel. Its result is indicated by an upward triangle. As to an ending point, a pixel in which a line segment going from inside the frame toward the outside the frame last intersects with the Diamond frame includes an ending point. Therefore, the main-axis coordinate (since the line in FIG. 14 is an X main-axis, the main-axis coordinate is an X-coordinate) is corrected up to the center of the pixel including an ending point. As to the sub-axis coordinate, ((the moving distance of the main-axis coordinate)*(the inclination value of a line)) is subtracted from the sub-axis coordinate of an ending point and it is corrected. Its result is indicated by a downward triangle.

FIG. 15 explains a detailed correction example of an end point (No. 7).

As to a starting point, a pixel in which a line segment going from outside the frame toward the outside the frame first intersects with the Diamond frame includes a starting point. However, since it includes a starting point and the starting point is outside the Diamond frame, the main-axis coordinate (since the line in FIG. 15 is an X main-axis, the main-axis coordinate is an X-coordinate) is corrected up to the center of the pixel. No sub-axis coordinate is corrected. Its result is indicated by an upward triangle. As to an ending point, a pixel in which a line segment going from inside the frame toward the outside the frame last intersects with the Diamond frame includes an ending point. However, since an ending point is always corrected, the main-axis coordinate (since the line in FIG. 15 is an X main-axis, the main-axis coordinate is an X-coordinate) is corrected up to the center of the pixel including an ending point. No sub-axis coordinate is corrected. Its result is indicated by a downward triangle.

Figure 16:
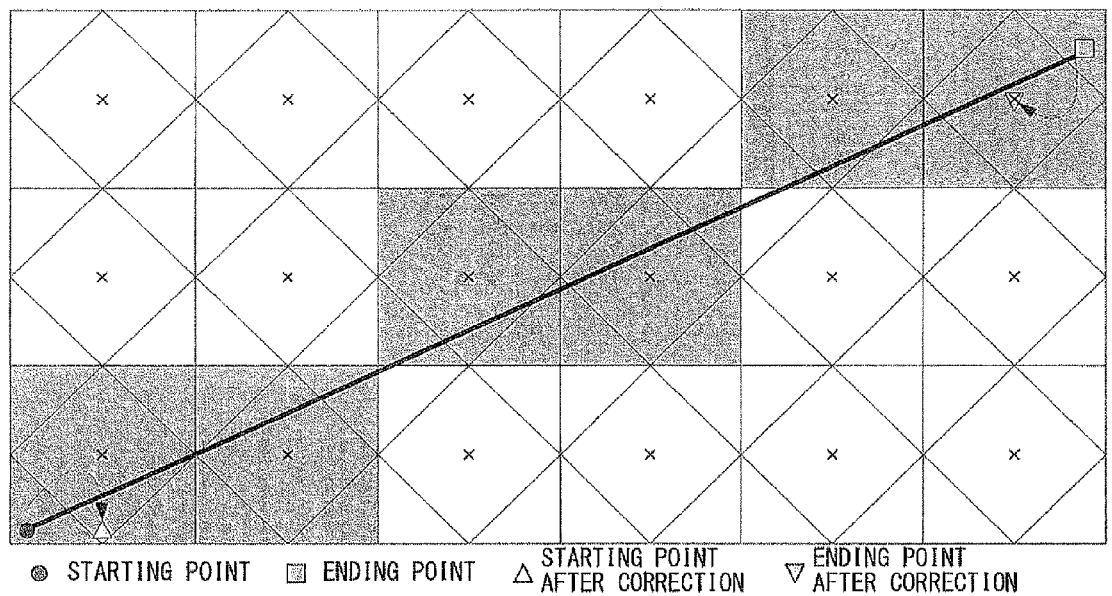
FIG. 16 explains an end point correction process (No. 9).

FIG. 16 explains a detailed correction example of an end point (No. 8).

As to a starting point, a pixel in which a line segment going from outside the frame toward the outside the frame first intersects with the Diamond frame includes a starting point. However, since it includes a starting point and the starting point is outside the Diamond frame, the main-axis coordinate (since the line in FIG. 16 is an X main-axis, the main-axis coordinate is an X-coordinate) is corrected up to the center of the pixel. No sub-axis coordinate is corrected. Its result is indicated by an upward triangle. As to an ending point, a pixel in which a line segment going from inside the frame toward the outside the frame last intersects with the Diamond frame includes an ending point. Therefore, the main-axis coordinate (since the line in FIG. 16 is an X main-axis, the main-axis coordinate is an X-coordinate) is corrected up to the center of the pixel including an ending point. The sub-axis coordinate is corrected to the position of the center of the pixel. Its result is indicated by a downward triangle.

Figure 17:
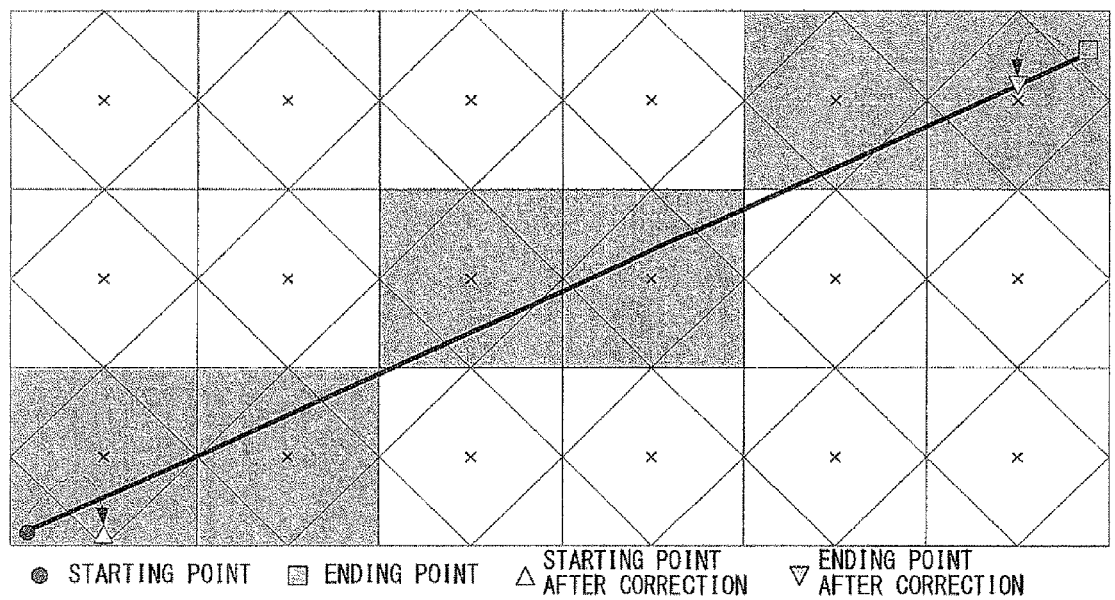
FIG. 17 explains an end point correction process (No. 10).

FIG. 17 explains a detailed correction example of an end point (No. 9).

As to a starting point, a pixel in which a line segment going from outside the frame toward the outside the frame first intersects with the Diamond frame includes a starting point. However, since it includes a starting point and the starting point is outside the Diamond frame, the main-axis coordinate (since the line in FIG. 17 is an X main-axis, the main-axis coordinate is an X-coordinate) is corrected up to the center of the pixel. No sub-axis coordinate is corrected. Its result is indicated by an upward triangle. As to an ending point, a pixel in which a line segment going from inside the frame toward the outside the frame last intersects with the Diamond frame includes an ending point. Therefore, the main-axis coordinate (since the line in FIG. 17 is an X main-axis, the main-axis coordinate is an X-coordinate) is corrected up to the center of the pixel including an ending point. As to the sub-axis coordinate, ((the moving distance of the main-axis coordinate)* (the inclination value of a line)) is subtracted from the sub-axis coordinate of an ending point and it is corrected. Its result is indicated by a downward triangle.

FIGS. 18 through 23 are flowcharts of the end point correction process according to this preferred embodiment.

Figure 18:
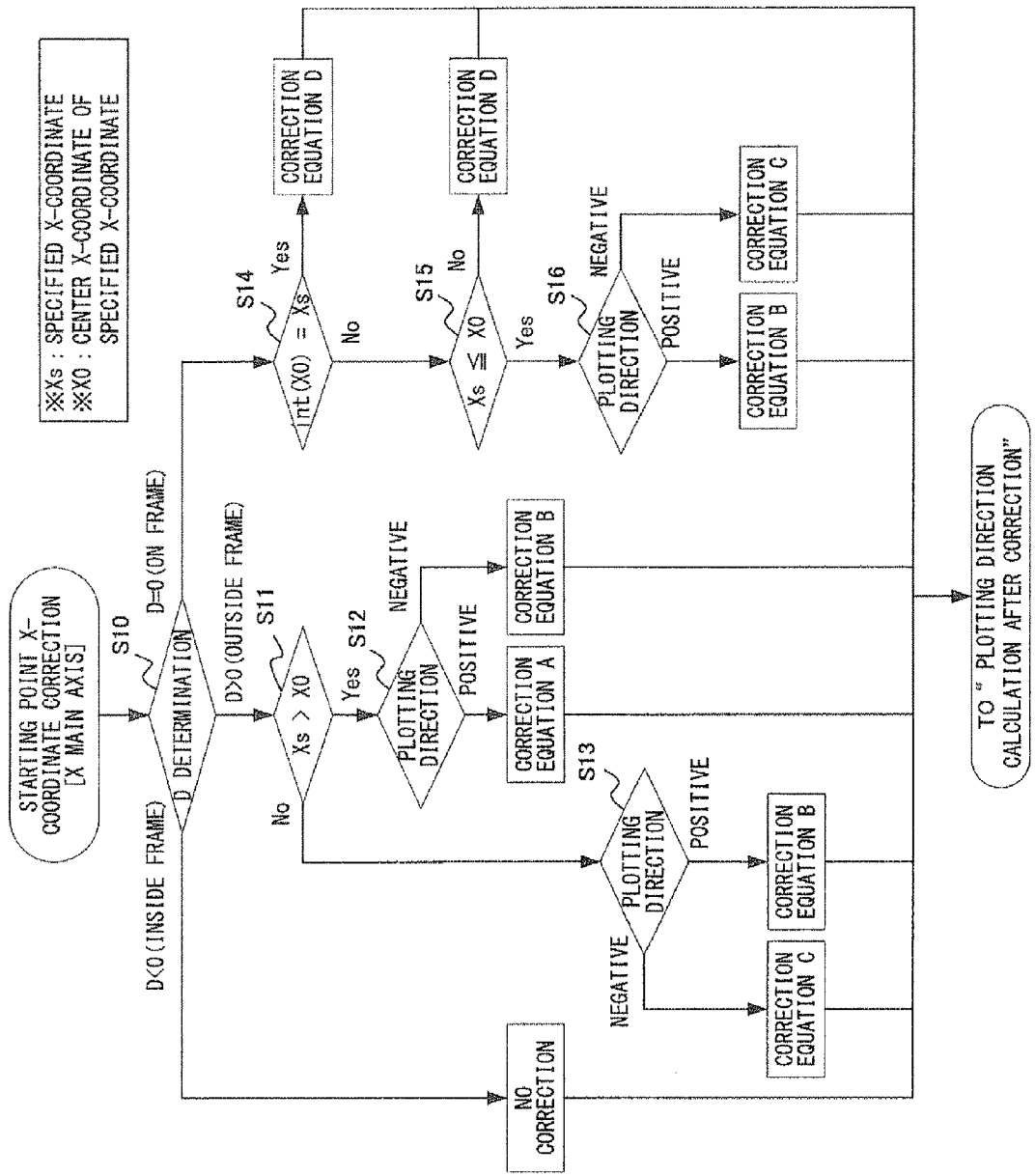
FIG. 18 is a flowchart of the end point correction process according to this preferred embodiment (No. 1).

FIG. 18 explains an end-point correction example of the X-coordinate of a starting-point in the case of an X main-axis. In FIG. 18, the following correction equations are used.

Starting-point X-coordinate after correction $AXs=int(Xs-PARAM)+1.5$      Correction equation A:

Starting-point X-coordinate after correction $AXs=int(Xs-PARAM)+0.5$      Correction equation B:

Starting-point X-coordinate after correction $AXs=int(Xs-PARAM)-0.5$      Correction equation C:

Starting-point X-coordinate after correction $AXs=int(Xs)-\alpha$      Correction equation D:

In the above equations, the PARAM value is as follows.

$Xs \geq 0:0$ $Xs < 0:1$

In the above equations, a is an infinitesimal value and is $2\hat{0}-16$ [0.00625] when expressed in a four-digit decimal. int means to the integer part of a numerical value enclosed by a parenthesis.

Firstly, in step S10, D determination or determination of whether a starting point is inside the Diamond frame, is performed. If in step S10 it is determined that it is inside the Diamond frame, no correction is performed and the process advances to plotting direction calculation. If in step S10 it is determined that it is outside the Diamond frame, in step S11 it is determined whether Xs>X0 (Xs is the X-coordinate of a starting point, X0 is the center X-coordinate of a pixel in which a starting point exits). If the determination in step S11 is no, in step S13 a plotting direction is determined. If it is determined that the plotting direction is negative, it is correction by correction equation C. If it is determined that the plotting direction is positive, it is correction by correction equation B. If the determination in step S11 is yes, in step S12 a plotting direction is determined. If in step S12 it is determined that the plotting direction is negative, it is correction by correction equation B. If in step S12 it is determined that the plotting direction is positive, it is correction by correction equation A. If in step S10 it is determined that a starting point is on the Diamond frame, in step S14 it is determined whether int(X0)=Xs. If the determination in step S14 is yes, it is correction by correction equation D. If the determination in step S14 is no, it is determined whether Xs≤X0. If the determination in step S15 is no, it is correction by correction equation D. If the determination in step S15 is yes, in step S16 a plotting direction is determined. If in step S16 the plotting direction is negative, it is correction by correction equation C. If in step S16 the plotting direction is positive, it is correction by correction equation B. After the correction, the process advances to plotting direction calculation.

Figure 19:
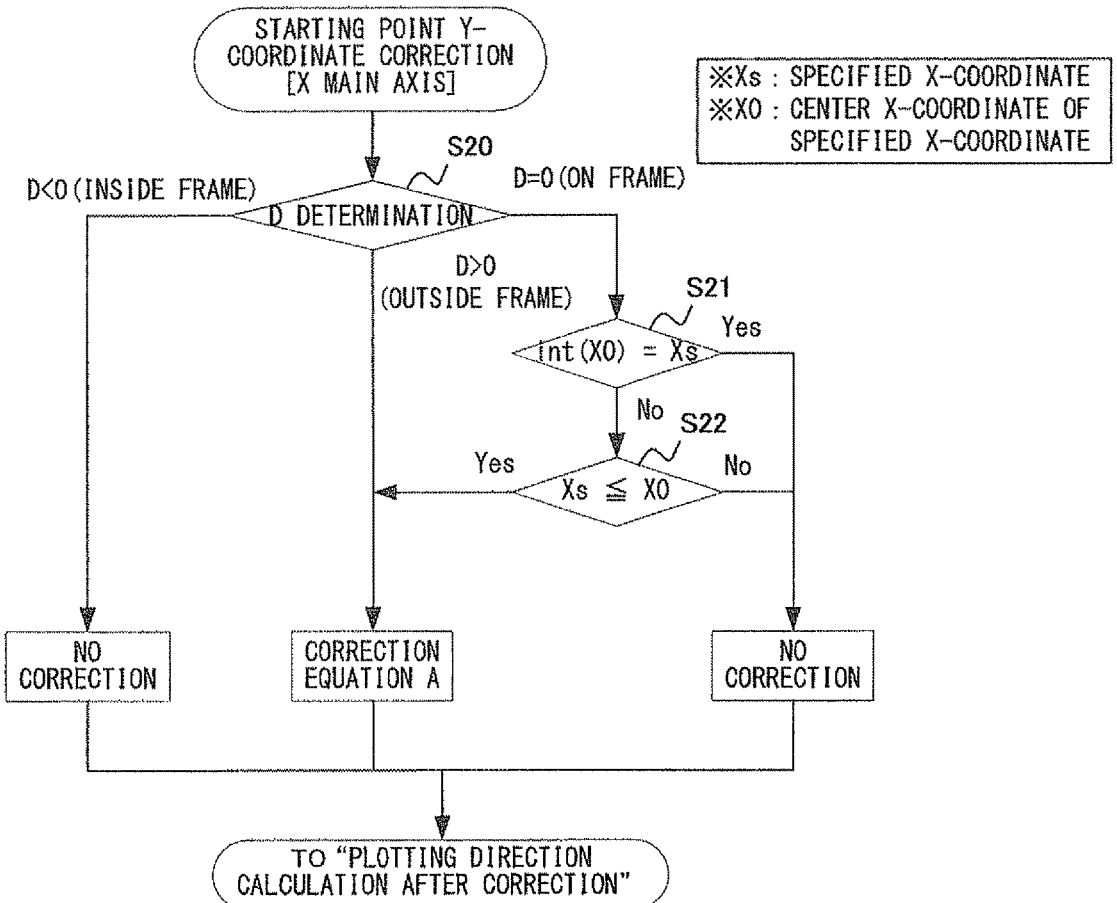
FIG. 19 is a flowchart of the end point correction process according to this preferred embodiment (No. 2).

FIG. 19 explains an end-point correction example of the Y-coordinate of a starting-point in the case of an X main-axis. In FIG. 19, the following correction equations are used.

Starting-point Y-coordinate after correction $AYs=Y0+(|X0-Xs|*\text{inclination})$      Correction equation A:

In the above equation, X0 and Xs are the same as in FIG. 18. Y0 is the center Y-coordinate of a pixel including a starting point.

In step S20, it is determined whether a starting point is inside the Diamond frame. If in step S20 it is determined that it is inside the frame, the process advances to plotting direction calculation without performing any correction. If in step S20 it is determined that it is outside the frame, it is correction by correction equation A. If in step S20 it is determined that it is on the frame, in step S21 it is determined whether int(X0)=Xs. If the determination in step S21 is yes, the process advances to plotting direction calculation without performing any correction. If the determination in step S21 is no, in step S22 it is determined whether Xs≤X0. If the determination in step S22 is no, it is not corrected. If the determination in step S22 is yes, it is correction by correction equation A. After these processes are completed, the process advances to plotting direction calculation.

FIG. 20 explains an end-point correction example of the X-coordinate of an ending-point in the case of an X main-axis. In FIG. 20, the following correction equations are used.

Ending-point X-coordinate after correction $AXe=int(Xe-PARAM)+1.5$      Correction equation A:

Ending-point X-coordinate after correction $AXe=int(Xe-PARAM)+0.5$      Correction equation B:

Ending-point X-coordinate after correction $AXe=int(Xe-PARAM)-0.5$      Correction equation C:

Ending-point X-coordinate after correction $AXe=int(Xs-PARAM)-1.5$      Correction equation D:

In the above equations, the PARAM value is as follows.

$Xe \geq 0:0$ $Xe < 0:1$

In step S25, it is determined whether an ending point is inside the Diamond frame. If in step S25 it is determined that it is inside the frame, in step S26 a plotting direction is determined. If in step S26 it is determined that the plotting direction is negative, it is correction by correction equation A. If in step S26 it is determined that the plotting direction is positive, it is corrected by correction equation C. If in step S25 it is determined that it is outside the frame, in step S27 it is determined whether Xe>X0. If the determination in step S27 is no, in step S29 a plotting direction is determined. If it is determined that the plotting direction is negative, it is correction by correction equation B. If it is determined that the plotting direction is positive, it is correction by correction equation C. If the determination in step S27 is yes, in step S28 a plotting direction is determined. If it is determined that the plotting direction is negative, it is correction by correction equation A. If it is determined that the plotting direction is positive, it is correction by correction equation B. If in step S25 it is determined that the ending point is on the frame, in step S30 it is determined whether int (X0)=Xe. If the determination in step S30 is yes, in step S34 a plotting direction is determined. If the plotting direction is negative, it is correction by correction equation B. If the plotting direction is positive, it is correction by correction equation D. If the determination in step S30 is no, in step S31 it is determined whether Xe≤X0. If the determination in step S31 is yes, in step S32 a plotting direction is determined. If it is determined that the plotting direction is negative, it is correction by correction equation B. If it is determined that the plotting direction is positive, it is correction by correction equation C. If the determination in step S31 is no, in step S33 a plotting direction is determined. If it is negative, it is correction by correction equation A. If it is positive, it is correction by correction equation C. After the correction, the process advances to plotting direction calculation.

Figure 21:
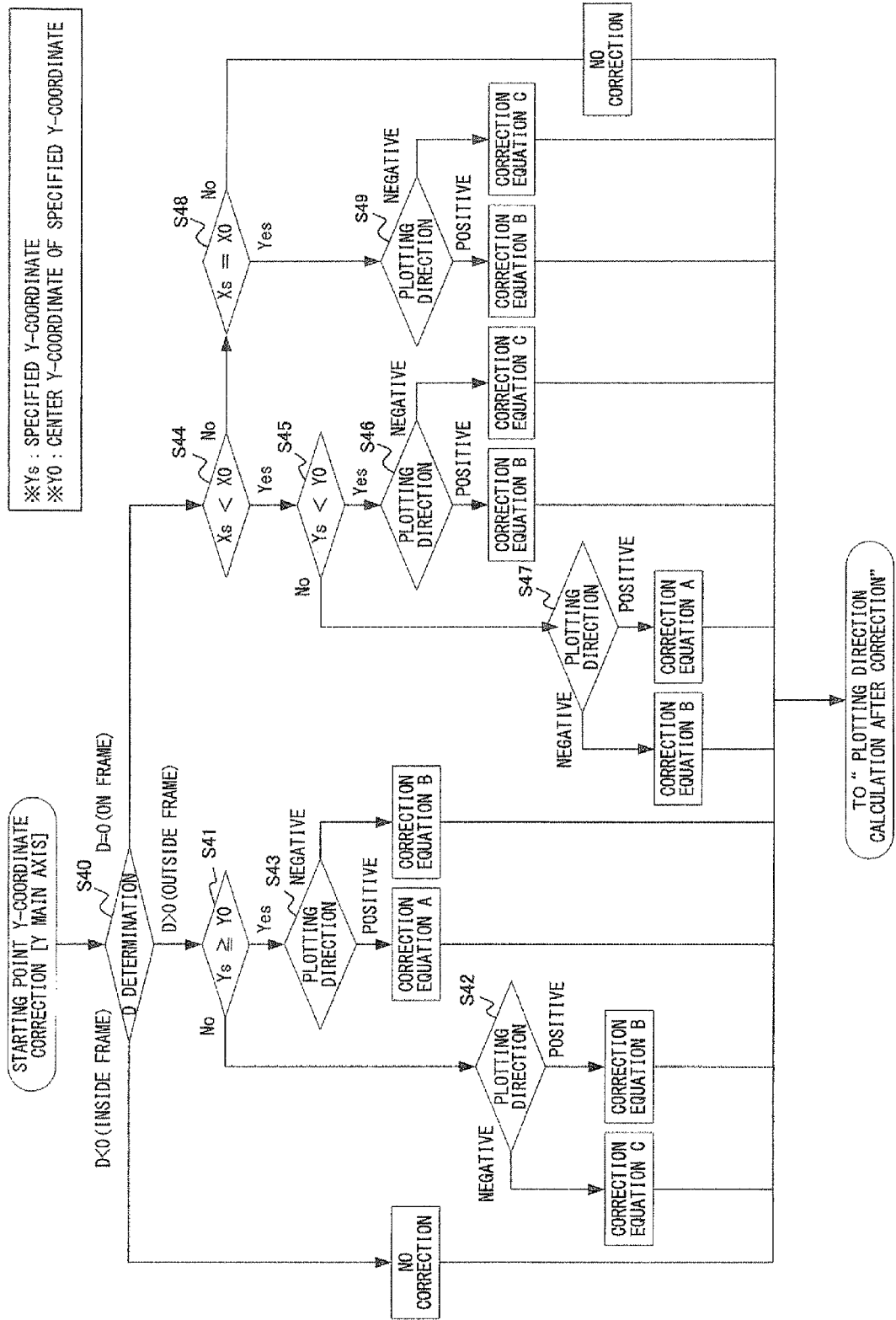
FIG. 21 is a flowchart of the end point correction process according to this preferred embodiment (No. 4).

FIG. 21 explains an end-point correction example of the Y-coordinate of a starting-point in the case of a Y main-axis. In FIG. 21, the following correction equations are used.

Starting-point Y-coordinate after correction $AYs=int(Ys\text{-PARAM})+1.5$  Correction equation A:

Starting-point Y-coordinate after correction $AYs=int(Ys\text{-PARAM})+0.5$  Correction equation B:

Starting-point Y-coordinate after correction $AYs=int(Ys\text{-PARAM})-0.5$  Correction equation C:

In the above equations, the PARAM value is as follows.

$Ys≥0:0$ $Ys<0:1$

Ys is the y-coordinate of a starting point.

In step S40 it is determined whether a starting point is inside the Diamond frame. If in step S40 it is determined that it is inside the frame, the process advances to a plotting direction calculation process without performing any correction. If in step S40 it is determined that it is outside the frame, in step S41 it is determined whether Ys≥Y0 (center y-coordinate of a pixel to which the starting point belongs). If the determination in step S41 is no, in step S42 a plotting direction is determined. If the plotting direction is negative, it is corrected by correction equation C. If the plotting direction is positive, it is corrected by correction equation B. If the determination in step S41 is yes, in step S43 a plotting direction is determined. If the plotting direction is negative, it is corrected by correction equation B. If the plotting direction is positive, it is corrected by correction equation A. If in step S40 it is determined that it is on the frame, in step S44 it is determined whether Xs<X0. If the determination in step S44 is yes, in step S45 it is determined whether Ys<Y0. If the determination in step S45 is no, in step S47 a plotting direction is determined. If the plotting direction is negative, it is corrected by correction equation B. If the plotting direction is positive, it is corrected by correction equation A. If the determination in step S45 is yes, in step S46 a plotting direction is determined. If in step S46 it is determined that the plotting direction is positive, it is corrected by correction equation B. If in step S46 it is determined that the plotting direction is negative, it is corrected by correction equation C. If the determination in step S44 is no, in step S48 it is determined whether Xs=X0. The determination in step S48 is no, the process advances to a plotting direction calculation process without performing any correction. If the determination in step S48 is yes, in step S49 a plotting direction is determined. If in step S49 it is determined that the plotting direction is positive, it is corrected by correction equation B. If in step S49 it is determined that the plotting direction is negative, it is corrected by correction equation C. After the correction, the process advances to a plotting direction calculation process.

Figure 22:
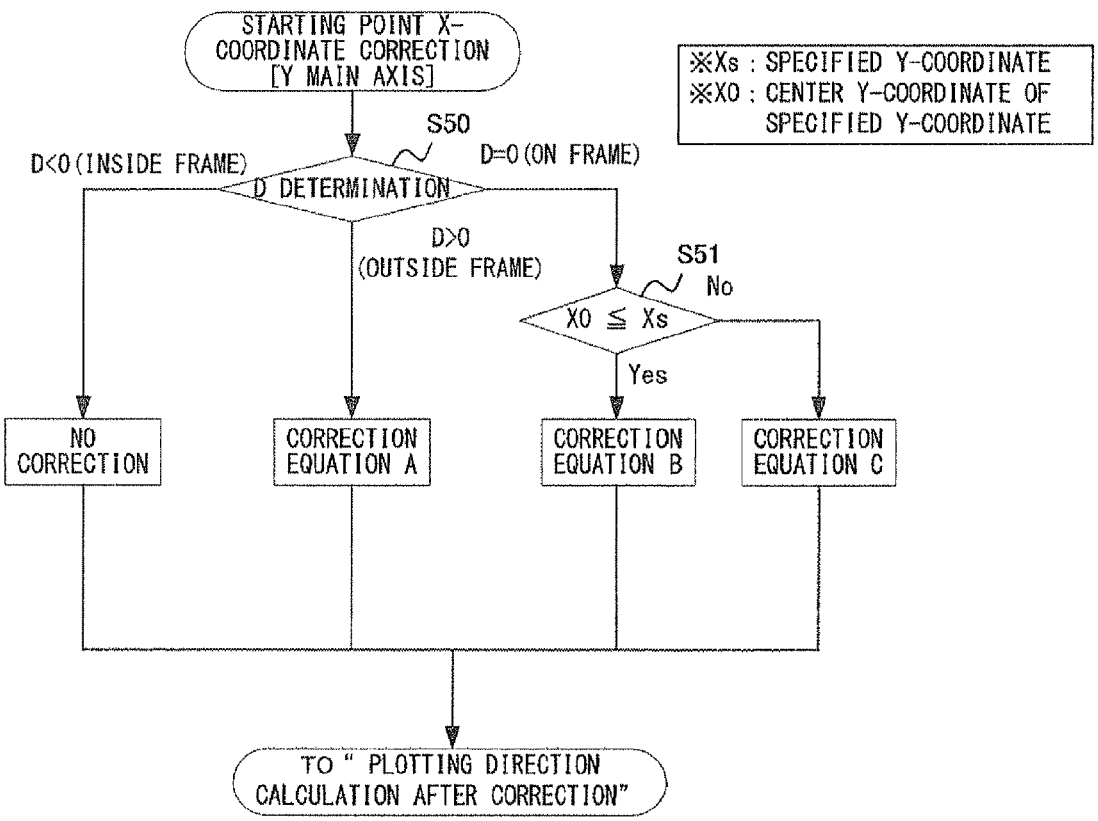
FIG. 22 is a flowchart of the end point correction process according to this preferred embodiment (No. 5).

FIG. 22 explains an end-point correction example of the X-coordinate of a starting-point in the case of a Y main-axis. In FIG. 22, the following correction equations are used.

Starting-point X-coordinate after correction $AXs=X0+(|Y0-Ys|*\text{inclination})$  Correction equation A:

Starting-point X-coordinate after correction $AXs=(X0+(|Y0-Ys|*\text{inclination}))-\alpha$  Correction equation B:

Starting-point X-coordinate after correction $AXs=X0-\alpha$  Correction equation C:

In the above equations, a is an infinitesimal value and is $2\hat{0}-16$ [0.00625] when expressed in a four-digit decimal.

In step S50 it is determined whether a starting point is inside the Diamond frame. If in step S50 it is determined that it is inside the frame, the process advances to a plotting direction calculation process without performing any correction. If in step S50 it is determined that it is outside the frame, it is corrected by correction equation A. If in step S50 it is determined that it is on the frame, in step S51 it is determined whether X0≤Xs. If the determination in step S51 is yes, it is corrected by correction equation B. If the determination in step S51 is no, it is corrected by correction equation C. After the correction, the process advances to a plotting direction calculation process.

Figure 23:
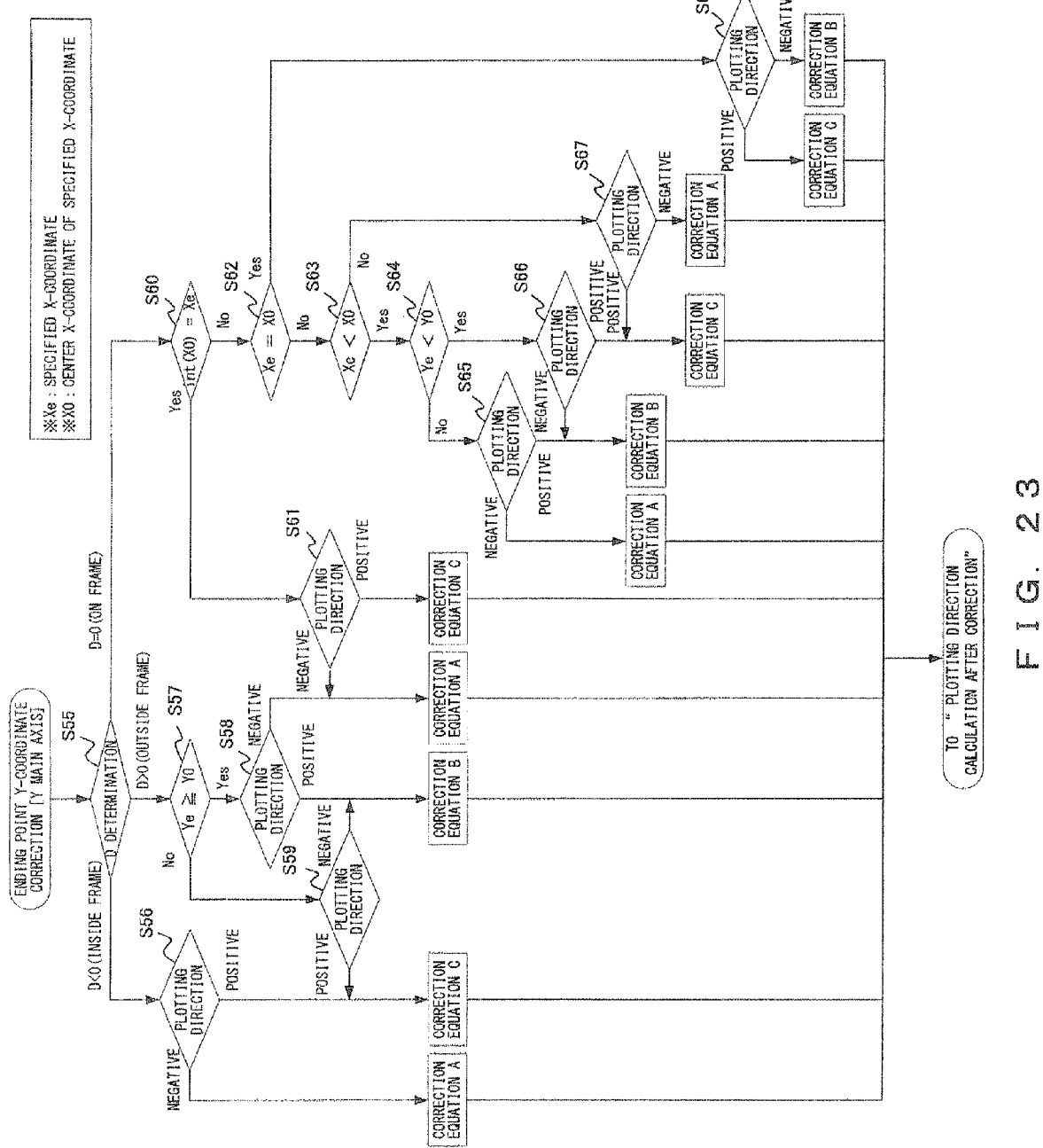
FIG. 23 is a flowchart of the end point correction process according to this preferred embodiment (No. 6).

FIG. 23 explains an end-point correction example of Y-coordinate of an ending-point in the case of a Y main-axis. In FIG. 23, the following correction equations are used.

Ending-point Y-coordinate after correction $AYe=int(Ye\text{-PARAM})+1.5$  Correction equation A:

Ending-point Y-coordinate after correction $AYe=int(Ye\text{-PARAM})+0.5$  Correction equation B:

Ending-point Y-coordinate after correction $AYe=int(Ye\text{-PARAM})-0.5$  Correction equation C:

In the above equations, the PARAM value is as follows.

$Ye≤0:0$ $Ye<0:1$

In step S55 it is determined whether an ending point is inside the Diamond frame. If it is determined that it is inside the frame, in step S56 a plotting direction is determined. If it is determined that the plotting direction is negative, it is corrected by correction equation A. If it is determined that the plotting direction is positive, it is corrected by correction equation C. If in step S55 it is determined it is outside the frame, in step S57 it is determined whether Ye≥Y0. If the determination in step S57 is no, in step S59 a plotting direction is determined. If the plotting direction is positive, it is corrected by correction equation C. If the plotting direction is negative, it is corrected by correction equation B. If the determination in step S57 is yes, in step S58 a plotting direction is determined. If the plotting direction is positive, it is corrected by correction equation B. If the plotting direction is negative, it is corrected by correction equation A. If in step S55 it is on the frame, in step S60 it is determined whether int (X0)=Xe. If the determination in step S60 is yes, in step S61 a plotting direction is determined. If the plotting direction is negative, it is corrected by correction equation A. If the plotting direction is positive, it is corrected by correction equation C. If the determination in step S60 is no, in step S62 it is determined whether Xe=X0. If the determination in step S62 is yes, in step S68 a plotting direction is determined. If the plotting direction is negative, it is corrected by correction equation B. If the plotting direction is positive, it is corrected by correction equation C. If the determination in step S62 is no, in step S63 it is determined whether Xe<X0. If the determination in step S63 is no, in step S67, a plotting direction is determined. If the plotting direction is negative, it is corrected by correction equation A. If the plotting direction is positive, it is corrected by correction equation C. If the determination in step S63 is yes, in step S64 it is determined Ye<Y0. If the determination in step S64 is no, in step S65 a plotting direction is determined. If the plotting direction is negative, it is corrected by correction equation A. If the plotting direction is positive, it is corrected by correction equation B. If the determination in step S64 is yes, in step S66 a plotting direction is determined. If the plotting direction is negative, it is corrected by correction equation B. If the plotting direction is positive, it is corrected by correction equation C. After the correction, the process advances to a plotting direction calculation process.

Figure 24A:
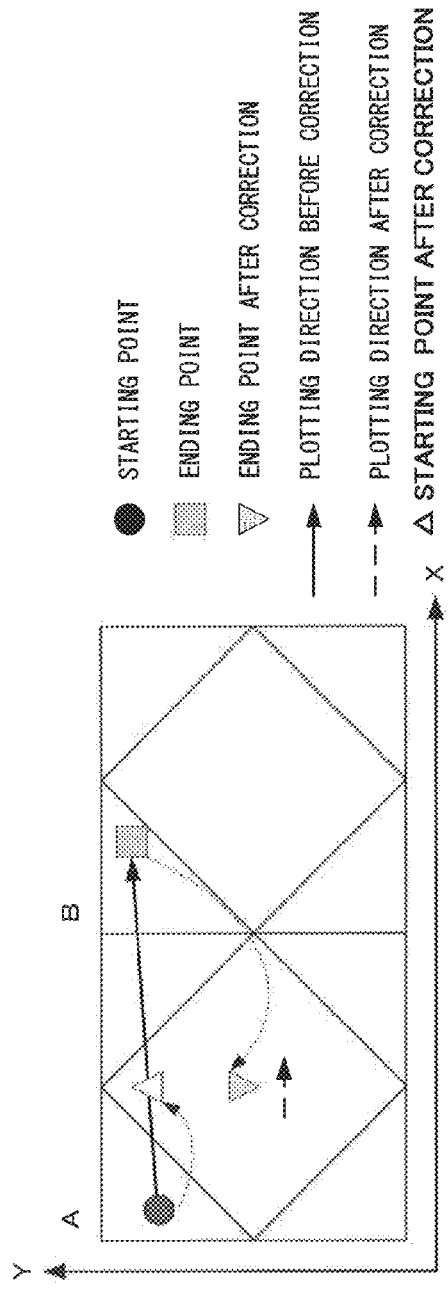
FIGS. 24A-24B explain a plotting direction determination process (No. 1).
Figure 24B:
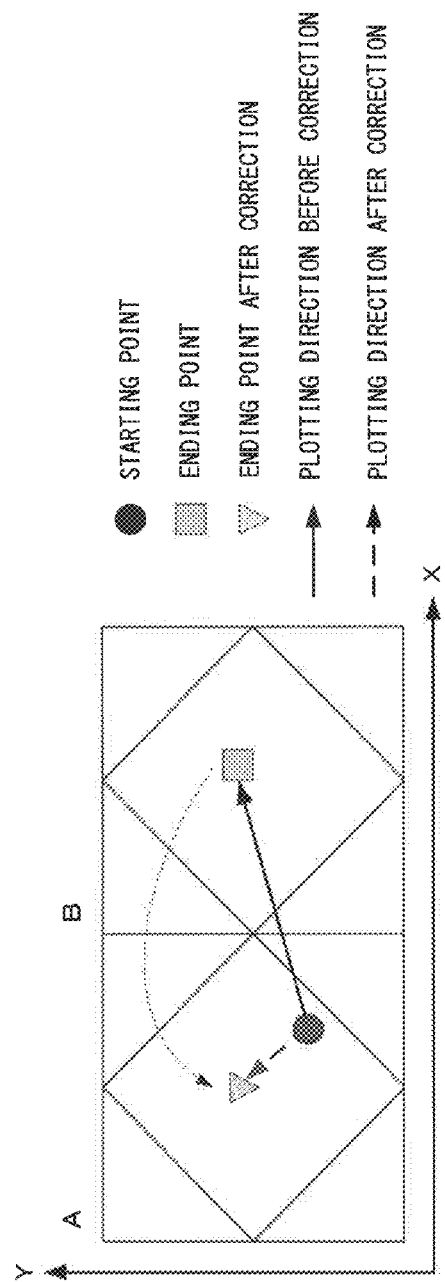
Figure 25:
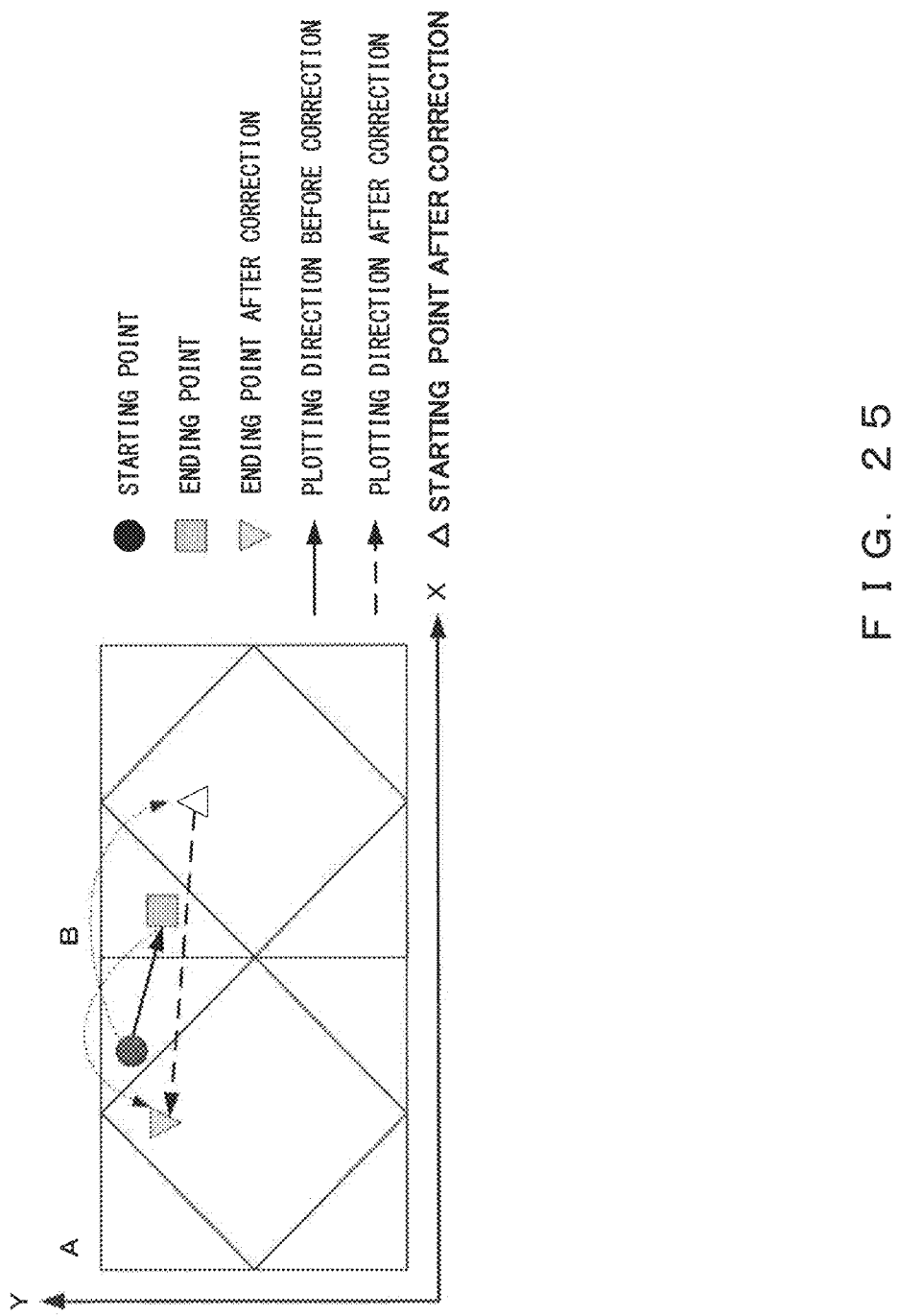
FIG. 25 explains a plotting direction determination process (No. 2).

FIGS. 24A-24B and 25 explain a plotting direction determination process.

In FIGS. 24A-24B and 25, descriptions are made assuming that the main axis is the X-axis. FIG. 24A illustrates a case where plotting directions before and after correction are the same. A line is plotted between a starting point in a pixel A and an ending point in a pixel B and it is necessary to determine which to plot only the pixel A or also the pixel B. In this example, since it is an X main-axis line, the main-axis coordinate is an X-coordinate. As to the staring point, the main-axis coordinate and sub-axis coordinates are corrected. As to the ending point, the main-axis coordinate is corrected. After the correction, since both the starting and ending points are included in the pixel A, the pixel B is not plotted and the problem is whether to plot the pixel A. in this case, its plotting directions before and after correction are determined. In this case, since the plotting direction before correction is positive (the right direction is assumed to be positive) and the plotting direction after correction is also positive, the plotting directions before and after correction are the same and it is determined to plot the pixel A.

FIG. 24B illustrates a case where plotting directions before and after correction are different. In this case, since it is an X main-axis line, the main-axis coordinate is an X-coordinate. As described above in the end-point correction, in the case of FIG. 24B, a starting point is not corrected. As to an ending point, the main-axis coordinate is corrected. Since its plotting direction before correction is positive and its plotting direction after correction is negative, it is detected that the plotting directions before and after correction are different. Then, the integer values of the X-coordinate of the starting and ending points after correction are compared (if the integer values are the same, they are in the same pixel). In this case, since the main-axis coordinates after correction are the same, it is determined to plot the pixel A.

FIG. 25 illustrates the determination process in the case of non-plotting. Since it is an X main-axis line, the main axis coordinate is an X-coordinate. As to a starting point, the main-axis coordinate (X-coordinate) and the sub-axis coordinate (Y-coordinate) are corrected. As to an ending point, the main-axis coordinate is corrected. Since a plotting direction before correction is positive and a plotting direction after correction is negative, it is detected that the plotting directions are different. Then, in this case, since the integer values of the main-coordinates after correction are different, it is determined not to plot both the pixels A and B.

Figure 26:
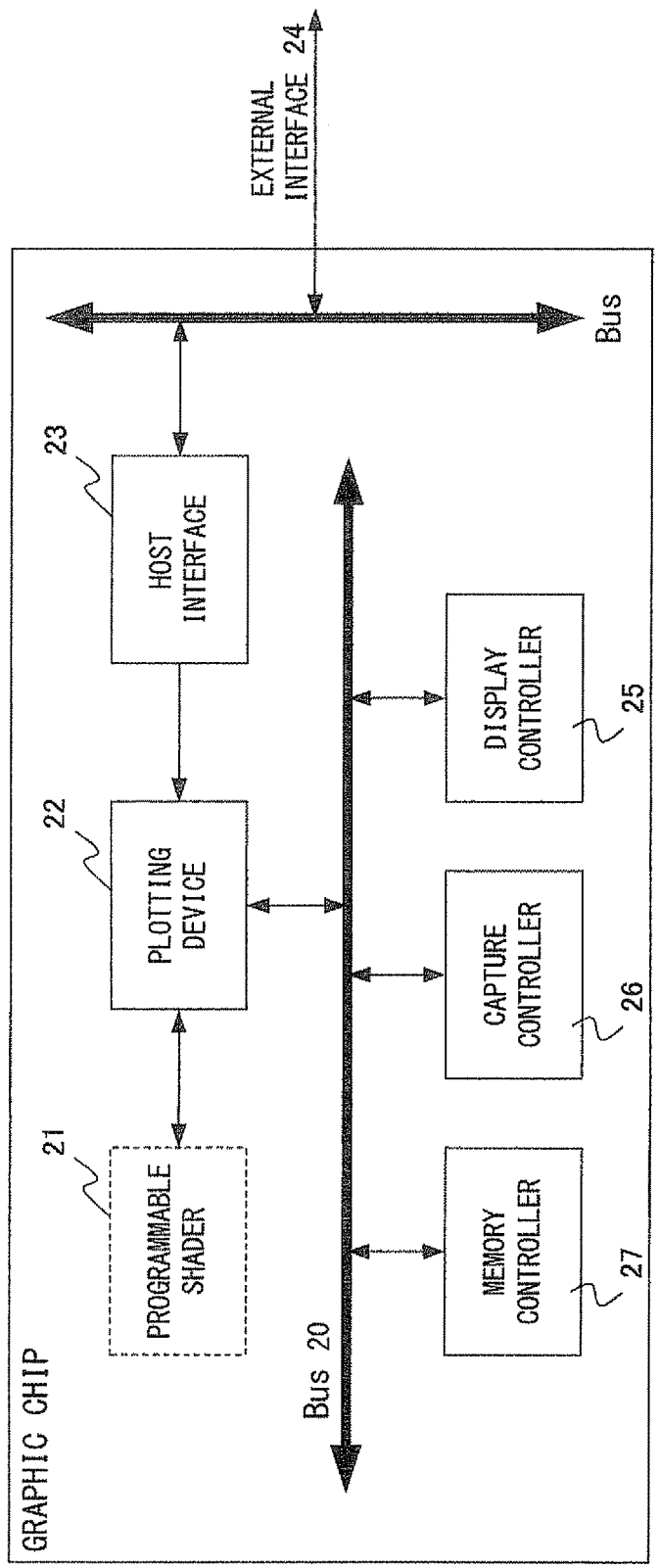
FIG. 26 is a block configuration of a device for realizing the line plotting method in this preferred embodiment (No. 1).

FIGS. 26 and 27 are block configurations of a device for realizing the line plotting method in this preferred embodiment.

FIG. 26 is the configuration of graphic chip, such as a car navigation system and the like. A plotting device 22 plots according to the program contents of a programmable shader 21. In this case, the plotting device 22 obtains plotting data from a memory controller 27 and a capture controller 26 that are connected to it by a bus 20, obtains display data by processing it, transmits the display data to a display controller 25 and display it. The plotting device 22 is connected to an external interface 24 via a host interface 23 in order to communicate with the outside.

FIG. 27 is the internal block configuration of the plotting device illustrated in FIG. 26. When vertex data is inputted to the plotting device 22, a vertex processing unit 30 calculates the coordinates of a vertex. The coordinates of a vertex are inputted to a graphic set-up unit 31 and it is calculated which pixel to plot. The graphic set-up unit 31 comprises a triangle set-up unit and a line set-up unit, which process triangles and lines, respectively. The above-described preferred embodiment is applied to the line set-up unit and this inside is illustrated in FIG. 1. When pixel plotting data is obtained, this is transmitted to a plotting process unit 32, is transmitted to external memory (image memory, etc.) and is displayed.

The above-described preferred embodiments can be also similarly applied to a line segment whose length is 1 or more. More particularly, as to a method for detecting 44 types of plotting patterns whose line length is less than 1, all the plotting patterns can be fairly easily detected, thereby surely realizing the plotting of a line whose length is less than 1 using the DiamondExit Rule.

FIGS. 28 through 33 are example comparison between this preferred embodiment and the prior art.

Figure 28:
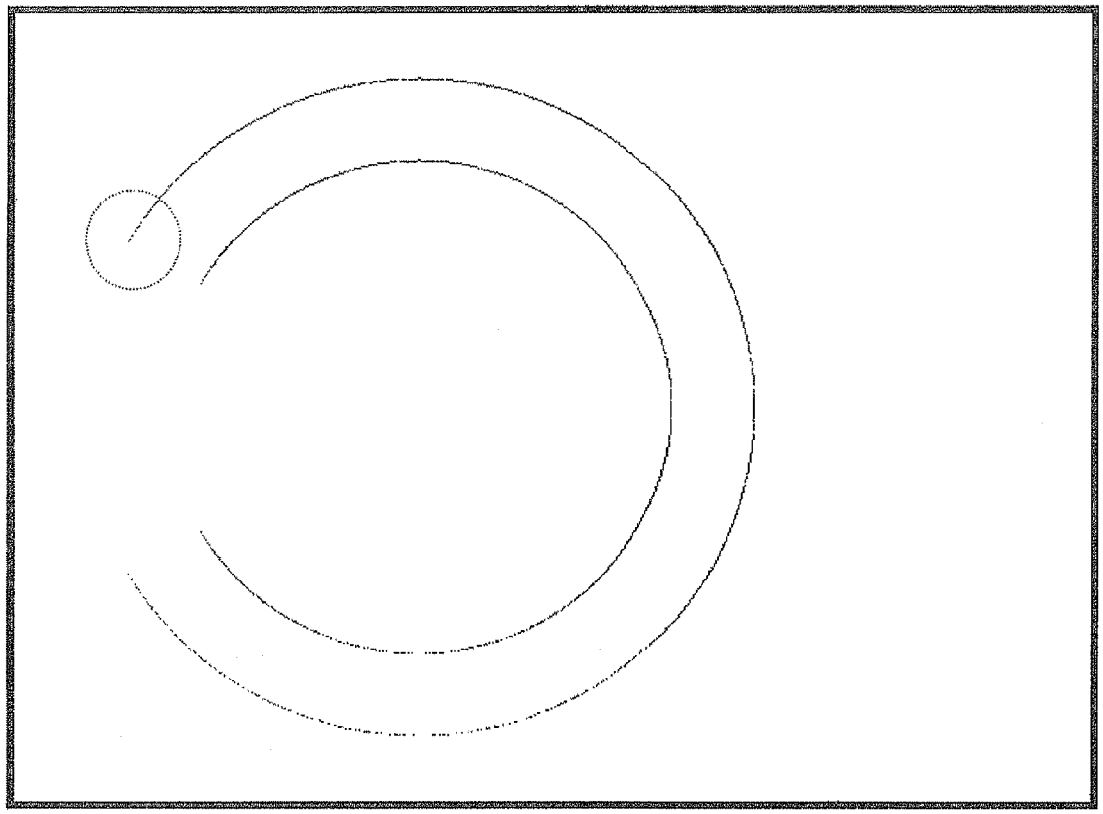
FIG. 28 is example comparison between this preferred embodiment and the prior art (No. 1).
Figure 29:
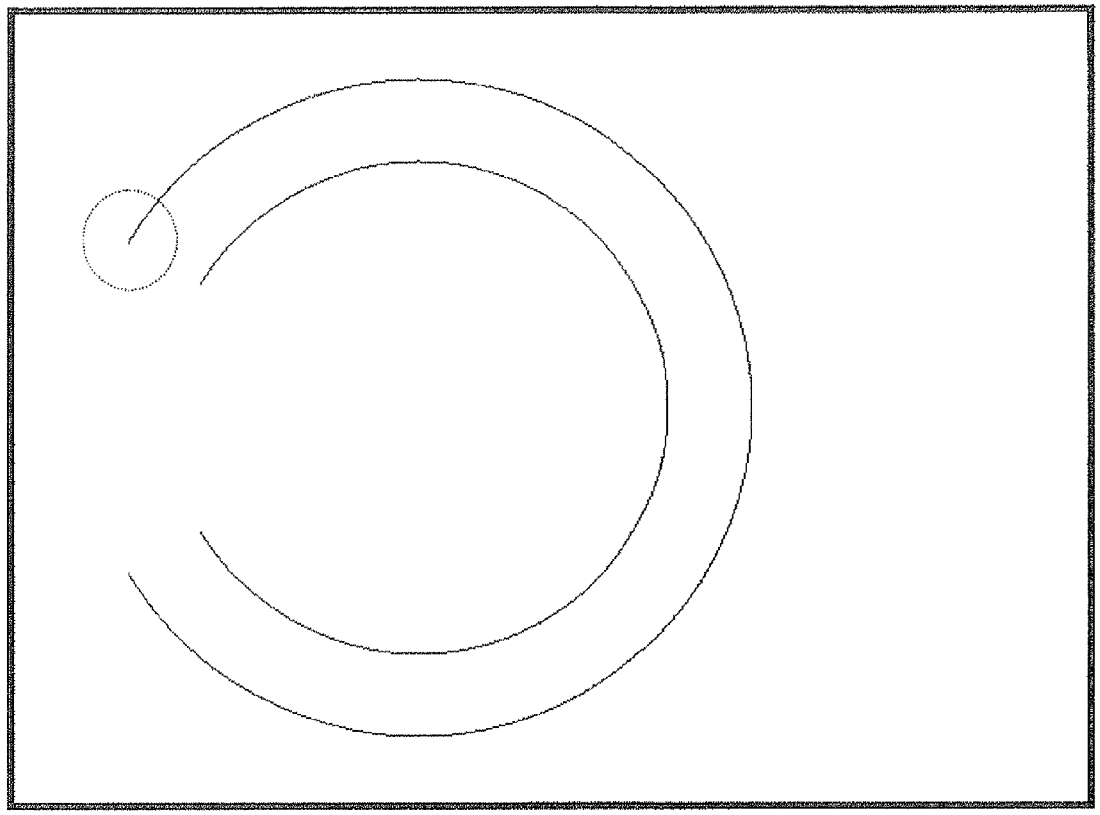
FIG. 29 is example comparison between this preferred embodiment and the prior art (No. 2).

In FIGS. 28 and 29, plotting in the case where the DiamondExit Rule is not applied in the prior art and plotting in the case where the DiamondExit Rule is applied in this preferred embodiment, respectively, are illustrated. These are obtained by plotting two circles using a group of short line segments (including a line segment whose length is less than 1). Although in the prior art, part of a circle is broken and is not displayed sporadically, according to this preferred embodiment, clear circles are plotted.

Figure 30:
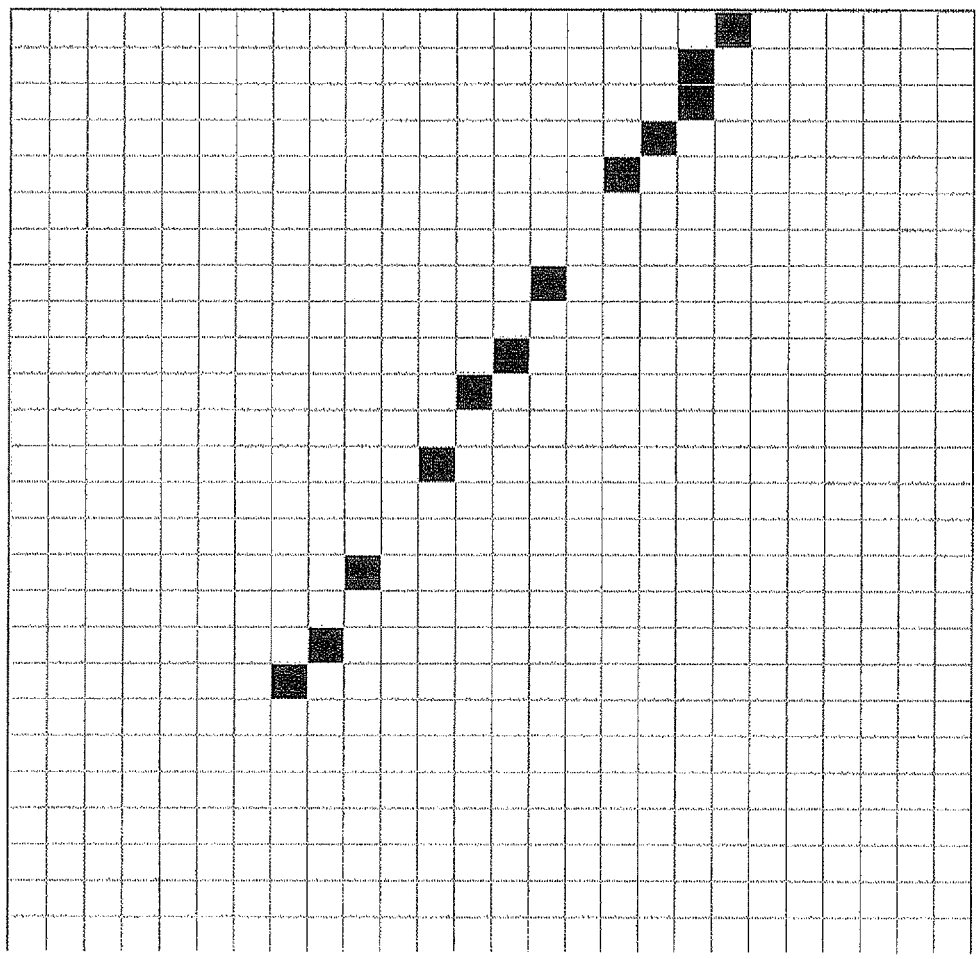
FIG. 30 is example comparison between this preferred embodiment and the prior art (No. 3).
Figure 31:
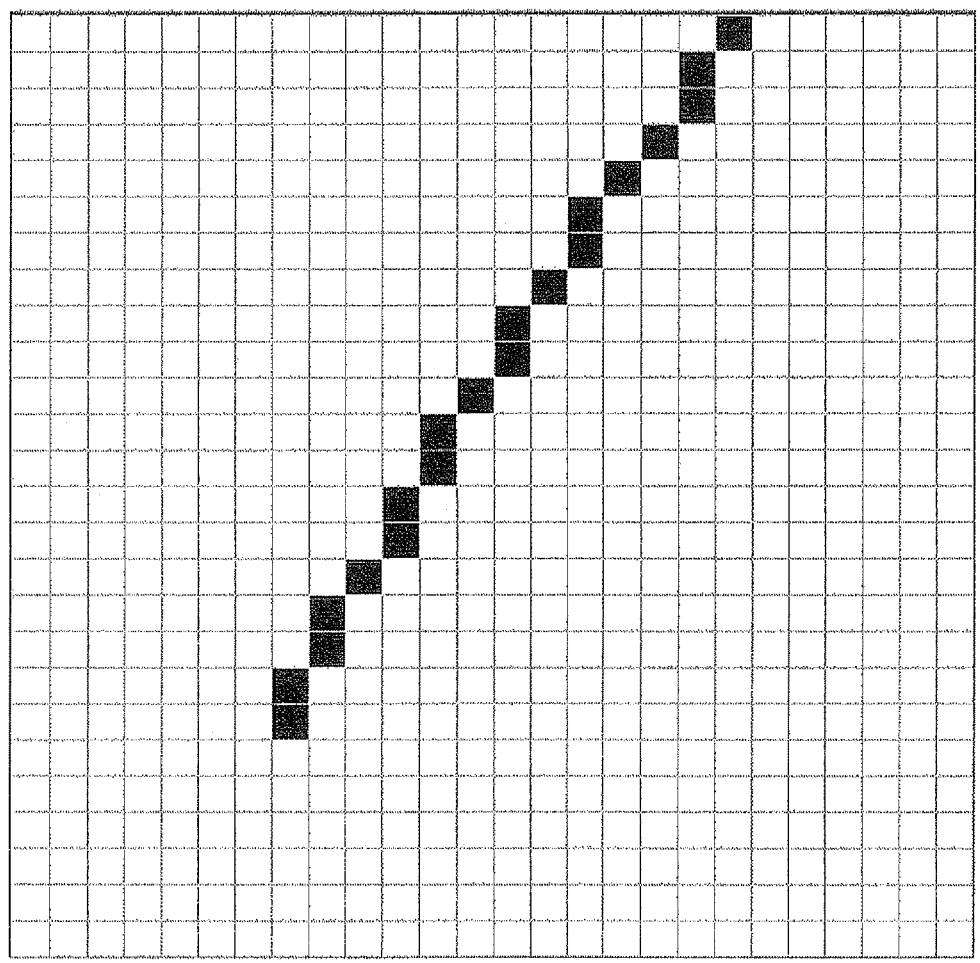
FIG. 31 is example comparison between this preferred embodiment and the prior art (No. 4).
Figure 32:
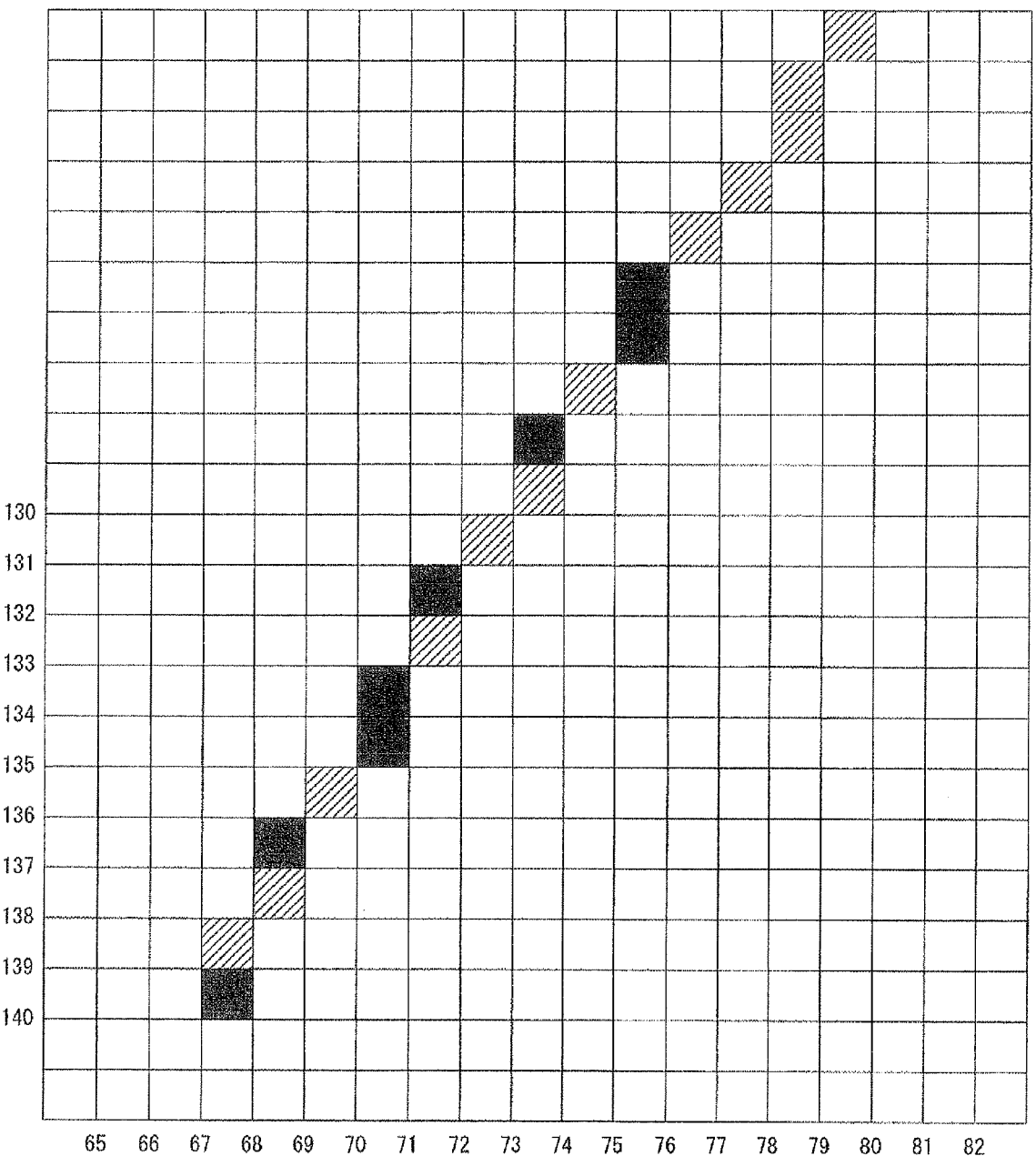
FIG. 32 is example comparison between this preferred embodiment and the prior art (No. 5).

FIGS. 30 and 31 are obtained by magnifying a part enclosed by a circle in FIGS. 28 and 29, respectively. FIG. 32 illustrates the difference between FIGS. 30 and 31. According to these, a pixel that is not plotted in the prior art is plotted in this preferred embodiment and a line is not broken.

In FIG. 33, a detailed example of the coordinate specification about a line in the first portion according to this preferred embodiment. Table 1 is detailed examples of coordinates and Tables 2 through 4 illustrate various combinations of end-point correction methods. Tables 5 and 6 illustrate the determination results of a plotting direction. Then, FIG. 33 illustrates the result of the operations illustrated in these tables.

TABLE 1

| | Coordinates | | | | | |
|---|---|---|---|---|---|---|
| | Starting point | | Ending point | | Line | |
| No | X | Y | X | Y | plotting | Remarks |
| 1 | 66.75 | 139.9375 | 67.1875 | 139.1875 | To plot | (67, 139) |
| 2 | 67.1875 | 139.1875 | 67.625 | 138.4375 | Not to plot | |
| 3 | 67.625 | 138.4375 | 68.0625 | 137.6875 | To plot | (67, 138) |
| 4 | 68.0625 | 137.6875 | 68.5625 | 136.9375 | To plot | (68, 137) |
| 5 | 68.5625 | 136.9375 | 69.0 | 136.1875 | To plot | (68, 136) |
| 6 | 69.0 | 136.1875 | 69.4375 | 135.4375 | Not to plot | |

TABLE 2

| | | Starting point correction | | |
|---|---|---|---|---|
| No. | Item | Main-axis coordinate | Sub-axis coordinate | Remarks |
| 1 | Method 1 | Position of *.5 | Position of "(Main-axis shifted portion) * (straight line inclination)" | |
| 2 | Method 2 | Position of *.5 | Position of *.5 | |
| 3 | Method 3 | Position of *.5 | No correction | |

TABLE 3

| | | Ending point correction | | |
|---|---|---|---|---|
| No. | Item | Main-axis coordinate | Sub-axis coordinate | Remarks |
| 1 | Method 1 | Position of *.5 | No correction | |
| 2 | Method 2 | Position of *.5 | Position of *.5 | |
| 3 | Method 3 | Position of *.5 | Position of "(Main-axis shifted portion) * (straight line inclination)" | |

TABLE 4

| | combination method | | |
|---|---|---|---|
| No. | Starting point correction | Ending point correction | Remarks |
| 1 | Method 1 | Method 1 | FIG. 9 |
| 2 | | Method 2 | FIG. 10 |
| 3 | | Method 3 | FIG. 11 |
| 4 | Method 2 | Method 1 | FIG. 12 |
| 5 | | Method 2 | FIG. 13 |
| 6 | | Method 3 | FIG. 14 |
| 7 | Method 3 | Method 1 | FIG. 15 |
| 8 | | Method 2 | FIG. 16 |
| 9 | | Method 3 | FIG. 17 |

TABLE 5

| | | | Operation method | | Plotting direction | |
|---|---|---|---|---|---|---|
| No. | Item | Main axis | Operation formula | Sign | Result | Remarks |
| 1 | Before correction | X main-axis | Ending point X-coordinate before correction − starting point X-coordinate before correction | + | Positive | |
| 2 | | | | − | Negative | |
| 3 | | Y main-axis | Ending point Y-coordinate before correction − starting point Y-coordinate before correction | + | Positive | |
| 4 | | | | − | Negative | |
| 5 | After correction | X main-axis | Ending point X-coordinate after correction − starting point X-coordinate after correction | + | Positive | |
| 6 | | | | − | Negative | |
| 7 | | Y main-axis | Ending point Y-coordinate after correction − starting point Y-coordinate after correction | + | Positive | |
| 8 | | | | − | Negative | |

TABLE 6

| | | | Operation method | | Plotting direction | |
|---|---|---|---|---|---|---|
| No. | Item | Main axis | Operation formula | Sign | Result | Remarks |
| 1 | Before correction | X main-axis | Starting point X-coordinate before correction − ending point X-coordinate before correction | + | Negative | |
| 2 | | | | − | Positive | |
| 3 | | Y main-axis | Starting point Y-coordinate before correction − ending point Y-coordinate before correction | + | Negative | |
| 4 | | | | − | Positive | |

TABLE 6-continued

| | Operation method | | Plotting direction | | |
|---|---|---|---|---|---|
| No. | Item | Main axis | Operation formula | Sign | Result | Remarks |
| 5 | After correction | X main-axis | Starting point X-coordinate after correction – ending point X-coordinate after correction | + | Negative | |
| 6 | | | | – | Positive | |
| 7 | | Y main-axis | Starting point Y-coordinate after correction – ending point Y-coordinate after correction | + | Negative | |
| 8 | | | | – | Positive | |

In the above table, position of *0.5 means the coordinate position of the center of a pixel.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A line plotting method comprising:
   a first correcting, using a plotting device in a graphic chip, of a first axis coordinate of a starting point or an ending point in accordance with a pixel of a prescribed frame intersecting a line having the starting point and the ending point,
   wherein the first axis coordinate corresponds to a greater of a first difference and a second difference, the first difference being a difference between X-coordinates of the starting point and the ending point and the second difference being a difference between Y-coordinates of the starting point and the ending point of the line; and
   a second correcting, using the plotting device in the graphic chip, of a second axis coordinate of the starting point or the ending point by adding or subtracting, respectively, a calculated value to the second axis coordinate,
   wherein the calculated value is determined based on a product of a moving distance of the first axis coordinate and an inclination value of the line.

2. The line plotting method according to claim 1, wherein:
   an axis corresponding to the first axis coordinate is a first axis and another axis corresponding to the second axis coordinate is a second axis; and
   the first axis coordinate of the starting point or the ending point is corrected up to one pixel back to a previous pixel or one pixel back to a center of the previous pixel.

3. The line plotting method according to claim 1, wherein the prescribed rule is a Diamond Exit Rule and the prescribed frame is a Diamond frame.

4. The line plotting method according to claim 1, wherein a car navigation system can be used for implementing the line plotting method.

5. The line plotting method according to claim 1, further comprising determining, using the plotting device in the graphic chip, whether a first direction from the starting point of the line toward the ending point after the first and second correcting is same as a second direction from the starting point of the line toward the ending point before the first and second correcting.

6. The line plotting method according to claim 5, further comprising plotting pixels, using the plotting device in the graphic chip, on a display screen in response to the first direction being same as the second direction.

7. The line plotting method according to claim 1, further comprising determining, using the plotting device in the graphic chip, whether a first direction from the starting point of the line toward the ending point after the first and second correcting is different from a second direction from the starting point of the line toward the ending point before the first and second correcting.

8. The line plotting method according to claim 7, further comprising determining, using the plotting device in the graphic chip, whether integer values of the first axis coordinates of the starting and ending points after the first correcting are equal to each other in response to the first direction being different from the second direction.

9. The line plotting method according to claim 8, further comprising plotting pixels, using the plotting device in the graphic chip, on a display screen in response to the first direction being different from the second direction and the integer values of the first axis coordinates of the starting point and the ending points being equal to each other after the first correcting.

10. A graphic device comprising:
    a graphic chip;
    a plotting device in the graphic chip, the plotting device being configured to:
      correct a first axis coordinate of a starting point or an ending point in accordance with a center pixel of a prescribed frame intersecting a line having the starting point and the ending point,
      wherein the first axis coordinate corresponds to a greater one of a first difference and a second difference, the first difference being a difference between X-coordinates of the starting point and the ending point and the second difference being a difference between Y-coordinates of the starting point and the ending point of the line;
      correct a second axis coordinate of the starting point or the ending point by adding or subtracting, respectively, a calculated value to the second axis coordinate,
      wherein the calculated value is determined based on a product of a moving distance of the first axis coordinate and an inclination value of the line; and
      determine whether a first direction from the starting point of the line toward the ending point after correction of the starting point or the ending point is same as a second direction from the starting point of the line toward the ending point before correction of the starting point and the ending point.

11. The graphic device according to claim 10, wherein the plotting device is further configured to determine whether integer values of the first axis coordinates of the starting and ending points after correction of the starting point or the ending point are equal to each other in response to the first direction being different from the second direction.

12. The graphic device according to claim 11, wherein the plotting device in the graphic chip is further configured to plot pixels on the display screen in response to the first direction being different from the second direction and the integer values of the first axis coordinates of the starting point and the ending points being equal to each other after the first correcting.

13. The graphic device according to claim 10, wherein the plotting device in the graphic chip is further configured to plot pixels on the display screen in response to the first direction being same as the second direction.

\* \* \* \* \*